US010911851B2

(12) United States Patent
Noh et al.

(10) Patent No.: US 10,911,851 B2
(45) Date of Patent: Feb. 2, 2021

(54) DISPLAY DEVICE AND METHOD OF DRIVING THE SAME

(71) Applicant: Samsung Display Co., Ltd., Yongin-si (KR)

(72) Inventors: Jung Hun Noh, Yongin-si (KR); Yi Joon Ahn, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/425,847

(22) Filed: May 29, 2019

(65) Prior Publication Data

US 2020/0059713 A1 Feb. 20, 2020

(30) Foreign Application Priority Data

Aug. 14, 2018 (KR) .......................... 10-2018-0095177

(51) Int. Cl.
*H04R 1/02* (2006.01)
(52) U.S. Cl.
CPC ......... *H04R 1/028* (2013.01); *H04R 2400/03* (2013.01); *H04R 2499/11* (2013.01); *H04R 2499/15* (2013.01)
(58) Field of Classification Search
USPC ........ 381/306, 111, 150, 190, 333, 336, 388
See application file for complete search history.

(56) References Cited

U.S. PATENT DOCUMENTS

| 10,200,772 B2 | 2/2019 | Ahn et al. |
| 2013/0311881 A1 | 11/2013 | Birnbaum et al. |
| 2015/0237426 A1 | 8/2015 | Davis |
| 2018/0109870 A1 | 4/2018 | Huang |
| 2019/0200111 A1* | 6/2019 | Kang ..................... H04R 1/028 |

FOREIGN PATENT DOCUMENTS

| EP | 2947857 | * 11/2015 | ............... G06F 1/16 |
| KR | 10-2013-0024420 | 3/2013 | |
| KR | 10-2013-0129127 | 11/2013 | |

OTHER PUBLICATIONS

Partial European Search Report dated Jan. 14, 2020, issued in the European Patent Application No. 19187698.6.

\* cited by examiner

*Primary Examiner* — Yosef K Laekemariam
(74) *Attorney, Agent, or Firm* — H.C. Park & Associates, PLC

(57) ABSTRACT

A display device includes: a display panel; and first and second sound generating device configured to generating sounds and vibrate the display panel, wherein the first sound generating device may have a higher sound pressure level than the second sound generating device in a first frequency range, and the second sound generating device may have a higher sound pressure level than the first sound generating device in a second frequency range lower than the first frequency range. A method of driving a display device in sound generating and haptic modes also is disclosed.

25 Claims, 26 Drawing Sheets

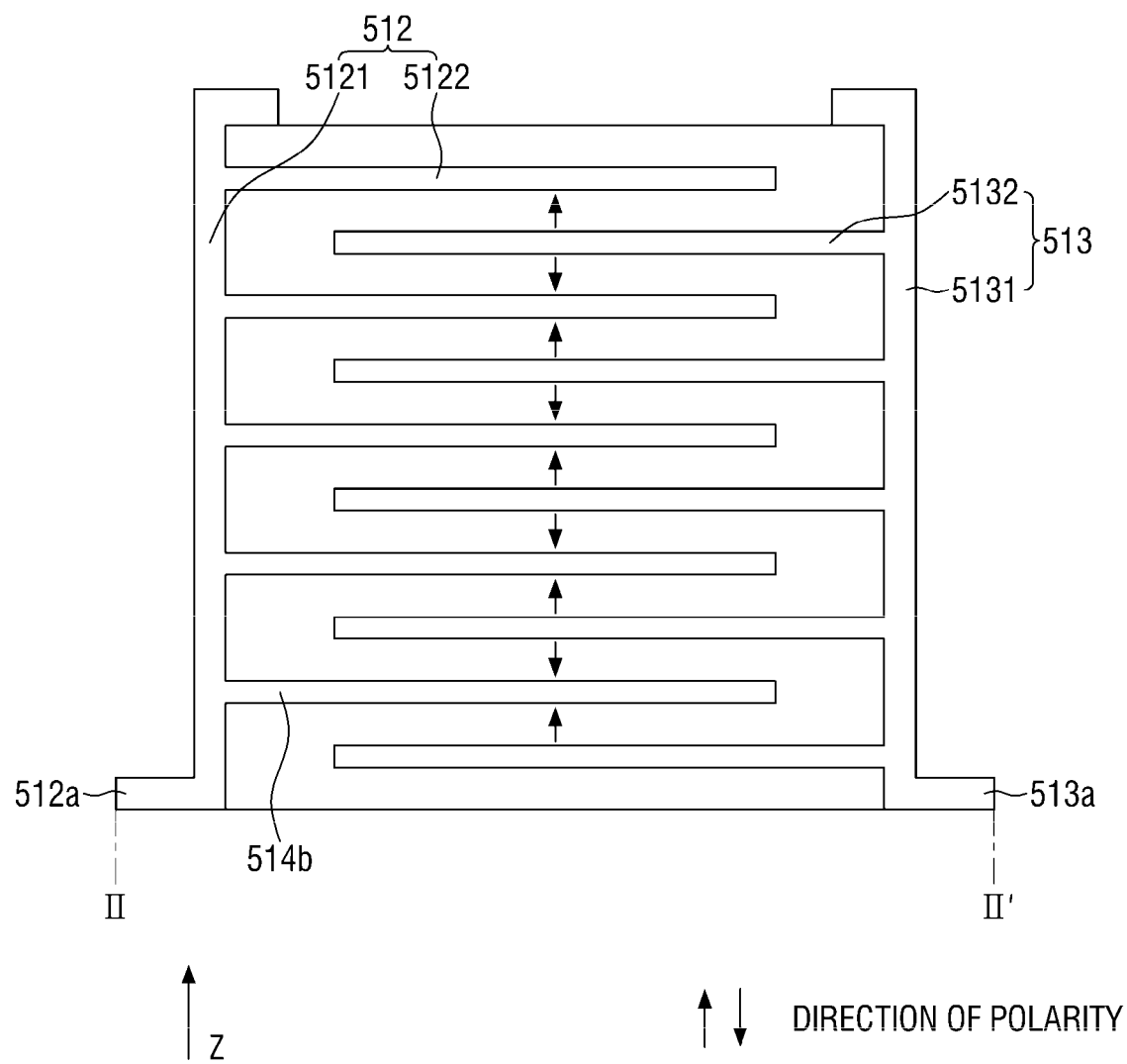

FIG. 10B
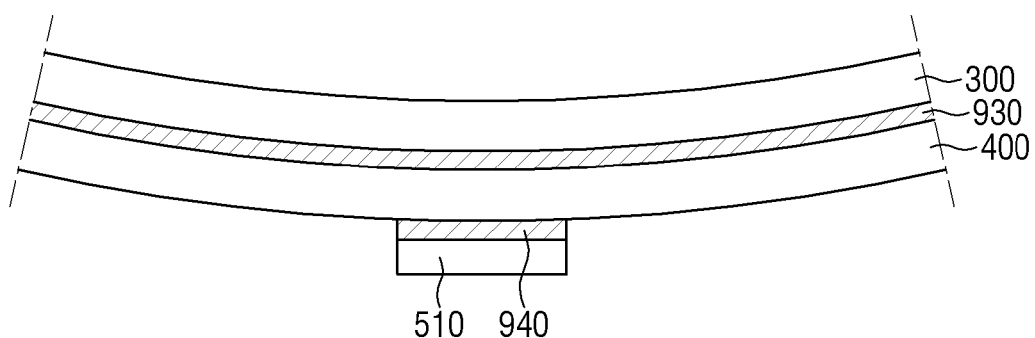
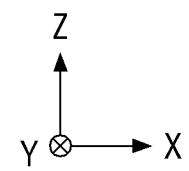

FIG. 10C
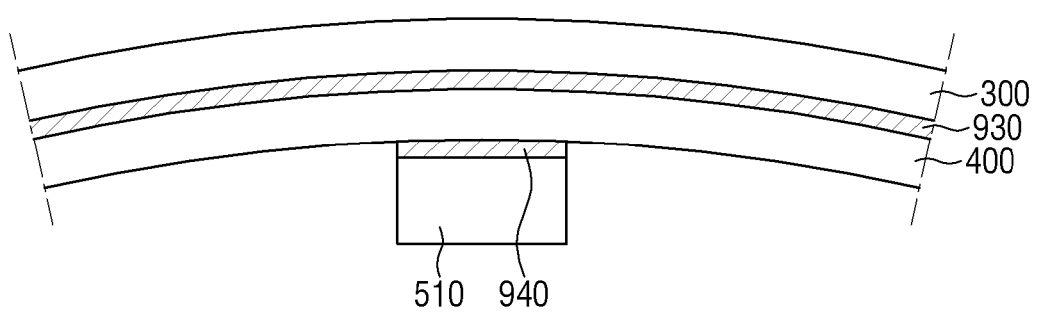
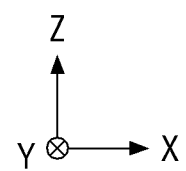

DISPLAY DEVICE AND METHOD OF DRIVING THE SAME

CROSS-REFERENCE TO RELATED APPLICATION

This application claims priority from and the benefit of Korean Patent Application No. 10-2018-0095177, filed on Aug. 14, 2018, which is hereby incorporated by reference for all purposes as if fully set forth herein.

BACKGROUND

Field

Exemplary implementations of the invention relate generally to a display device and a method of driving the same and, more particularly, to a displace device having two speakers capable of being driven in sound generated in sound generation or haptic modes.

Discussion of the Background

As our information society develops, the demand for display devices for displaying images has increased and diversified. For example, display devices have been applied to a variety of electronic devices such as smart phones, digital cameras, notebook computers, navigation devices, and smart televisions (TVs). A display device may include a display panel for displaying images and a sound generating device for providing sounds.

As display devices are increasingly applied to various electronic devices, display devices having various designs are required. For example, for a smart phone, a display device capable of increasing the size of the display area by eliminating a sound generating device, which is for outputting the voice of the other party during a call, from the front surface thereof is required.

The above information disclosed in this Background section is only for understanding of the background of the inventive concepts, and, therefore, it may contain information that does not constitute prior art.

SUMMARY

Devices constructed according to exemplary implementations of the invention are capable of providing not only sounds with the use of sound generating devices that are not exposed to the outside, but also capable of providing haptic feedback to a user.

Also, methods according to exemplary implementations of the invention are also capable of not only driving a display device to provide sounds with the use of integrated, sound generating devices, but also capable of providing haptic feedback to a user.

According to the aforementioned and other exemplary embodiments of the invention, sounds can be provided using first and second sound generating devices, such as speakers, which are disposed under a display panel, and haptic feedback can be provided to a user by vibrating the second sound generating device. Accordingly, since a front speaker does not need to be provided at the front surface of a display device, the display area of the display device can be increased.

In addition, when the first sound generating device is formed as device, such as a piezoelectric actuator, having a high sound pressure level in a high frequency range and the second sound generating device is formed as a device, such as a linear resonant actuator (LRA), having a high sound pressure level in a low frequency range, sounds having a high sound pressure level in both the low and high frequency ranges can be provided to a user.

Additional features of the inventive concepts will be set forth in the description which follows, and in part will be apparent from the description, or may be learned by practice of the inventive concepts.

According to one or more embodiments of the invention, a display device including: a display panel; and first and second sound generating device configured to generating sounds and vibrate the display panel, wherein the first sound generating device may have a higher sound pressure level than the second sound generating device in a first frequency range, and the second sound generating device may have a higher sound pressure level than the first sound generating device in a second frequency range lower than the first frequency range.

At least one of the sound generating devices may be integrated in the display device.

The sound generating devices may be disposed below the display device.

The first and second sound generating devices may be selected from the group consisting of piezoelectric actuators and linear resonant actuators.

The first sound generating device and the second sound generating device at least partially may overlap each other vertically.

The second sound generating device may be disposed below the first sound generating device.

The first sound generating device may include: a first electrode to which a first driving voltage is applied; a second electrode to which a second driving voltage is applied; and a vibration layer which is disposed between the first and second electrodes and contracts or expands in in response to the first and second driving voltages applied to the first and second electrodes, respectively.

The first electrode may include: a first stem electrode; and first branch electrodes branched off from the first stem electrode, and wherein the second electrode may include: a second stem electrode; and second branch electrodes which are branched off from the second stem electrode, the second branch electrode extending substantially parallel to the first branch electrodes.

The first branch electrodes and the second branch electrodes may be alternately arranged along a direction substantially parallel to the first stem electrode.

The first stem electrode may be disposed on one side of the vibration layer, and the second stem electrode may be disposed on the other side of the vibration layer.

The vibration layer may include first and second contact holes penetrating the vibration layer, wherein the first stem electrode may be disposed in the first contact hole penetrating the vibration layer, and wherein the second stem electrode may be disposed in the second contact hole penetrating the vibration layer.

The first sound generating device may include: a first pad electrode connected to the first electrode; and a second pad electrode connected to the second electrode.

The display device may further include: a first sound circuit board connected to the first and second pad electrodes; and a second sound circuit board connected to a second sound pad electrode of the second sound generating device.

The display device may further include: a middle frame disposed below the display panel, and having first and second through holes penetrating the middle frame.

The display device may further include: a main circuit board disposed below the middle frame and including first and second sound connectors.

One end of the first sound circuit board may be connected to the first sound connector through the first through hole of the middle frame, and one end of the second sound circuit board is connected to the second sound connector through the second through hole of the middle frame.

The main circuit board may include: a first sound driving unit configured to transmit the first and second driving voltages to the first sound generating device; a second sound driving unit configure to transmit an alternating current voltage to the second sound generating device; and a main processor configured to transmit first sound data to the first sound driving unit and transmit second sound data or haptic data to the second sound generating device.

The display device may further include: a display circuit board attached to one side of the display panel; and a connection cable connected to a connector of the display circuit board, wherein the connection cable may be connected to a main connector of the main circuit board through a third through hole which penetrates the middle frame.

The first and second sound connectors may be disposed on one surface of the main circuit board, and wherein the main circuit board may be disposed on the other surface of the main circuit board.

The first sound generating device may be configured to vibrate in a vertical direction with respect to the surface of the display panel, and the second sound generating device is configured to vibrate in a horizontal direction with respect to the surface of the display panel.

The first and second sound generating devices may be configured to vibrate in a vertical direction with respect to the surface of the display panel.

The display device may further include: a member connecting one side of the first sound generating device and one side of the second sound generating device.

According to one or more embodiments of the invention, a method of driving first and second sound generating devices in a display device in which the first sound generating device has a higher sound pressure level than the second sound generating device in a first frequency range, and the second sound generating device has a higher sound pressure level than the first sound generating device in a second frequency range lower than the first frequency range, the method including: generating sounds in a sound output mode by driving the first and second sound generating devices; and generating haptic feedback in a haptic mode by driving the second sound generating device to cause the display device to vibrate.

The display device may include a display panel and generating sounds in the sound output mode includes vibrating the display panel.

The display device may include a display panel and generating haptic feedback in the haptic mode includes vibrating the display panel.

The display device may further include a processor generating output signals driving the first and second sound generating devices in either the sound output mode or the haptic mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 9 is a cross-sectional view taken along a sectional line II-II' of FIG. 8.

FIGS. 10B and 10C are schematic views illustrating how the display panel vibrates in response to the vibration of the first sound generating device.

DETAILED DESCRIPTION

Figure 1:
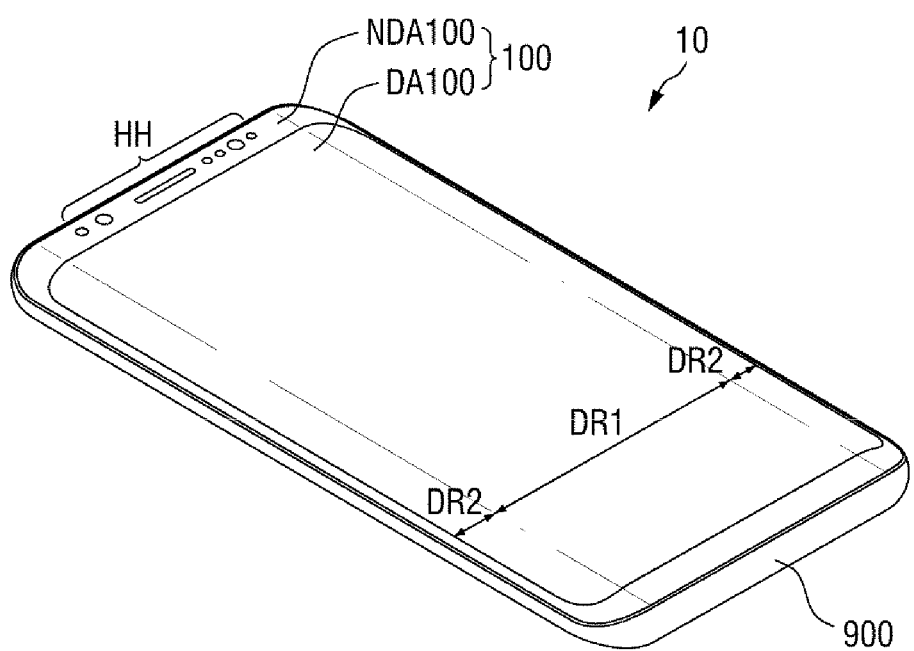
FIG. 1 is a perspective view of a display device constructed according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
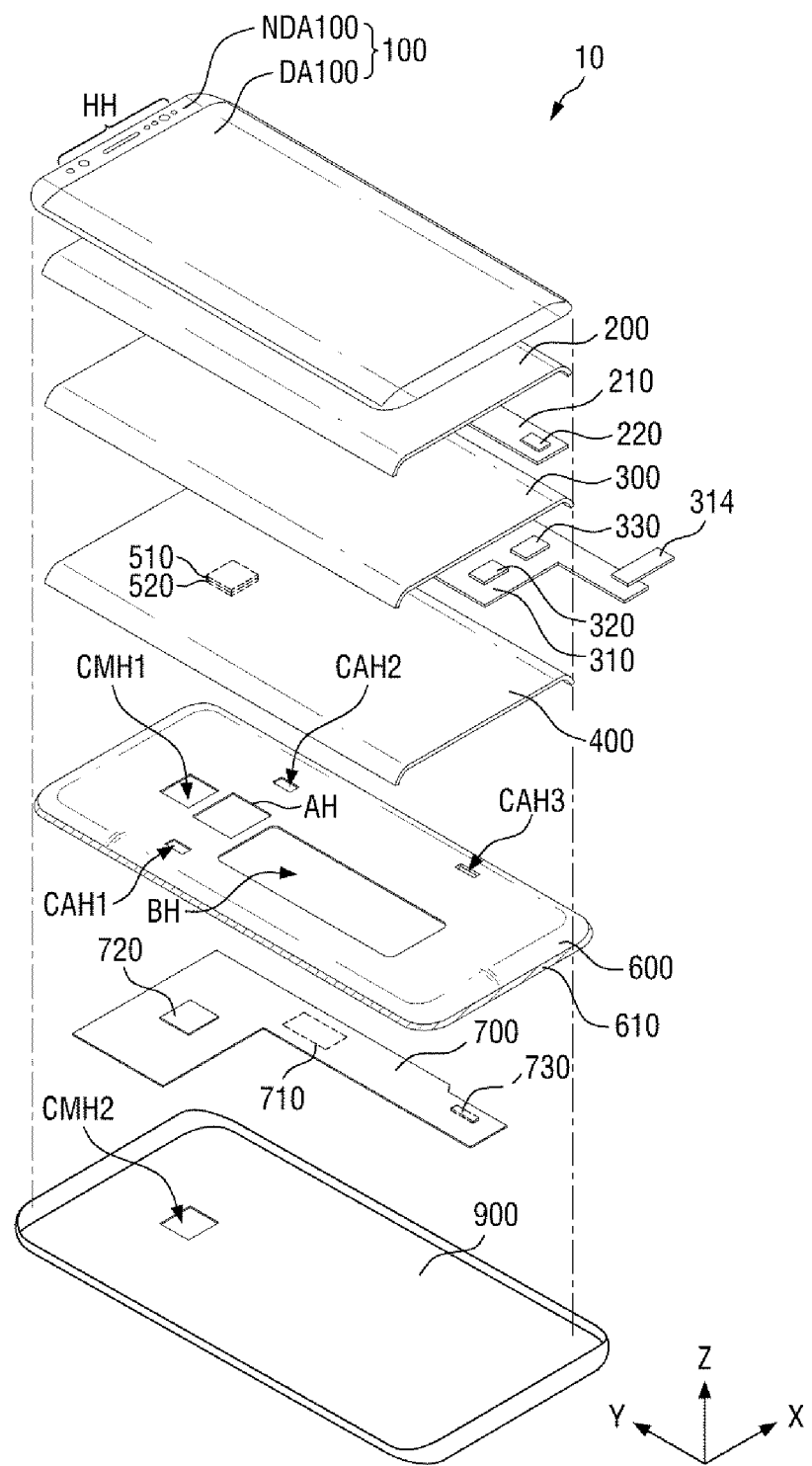
FIG. 2 is an exploded perspective view of the display device of FIG. 1.

FIG. 1 is a perspective view of a display device construed according to an exemplary embodiment of the invention. FIG. 2 is an exploded perspective view of the display device of FIG. 1.

Referring to FIGS. 1 and 2, a display device 10 includes a cover window 100, a touch sensing device 200, a touch circuit board 210, a touch driving unit 220, a display panel 300, a display circuit board 310, a display driving unit 320, a panel bottom support 400, a first sound generating device 510, a second sound generating device 520, a middle frame 600, a main circuit board 700, and a lower cover 900.

The terms "above", "top", and "top surface", as used herein, denote a direction in which the cover window 100 is disposed with respect to the display panel 300, i.e., a Z-axis direction, and the terms "below", "bottom", and "bottom surface", as used herein, denote a direction in which the middle frame 600 is disposed with respect to the display panel 300, i.e., the direction opposite to the Z-axis direction. Also, the terms "left", "right", "upper", and "lower", as used herein, denote corresponding directions as viewed from above the display panel 300. For example, the term "left" denotes the direction opposite to an X-axis direction, the term "right" denotes the X-axis direction, the term "upper" denotes a Y-axis direction, and the term "lower" denotes the direction opposite to the Y-axis direction.

The display device 10 may have a substantially rectangular shape in a plan view. For example, in a plan view, the display device 10 may have a substantially rectangular shape having short sides extending in a first direction (or the X-axis direction) and long sides extending in a second direction (or a Y-axis direction). The corners where the short sides and the long sides meet may be rounded or right-angled. The planar shape of the display device 10 is not particularly limited, and the display device 10 may be formed in various other shapes such as a polygonal shape other than a rectangular shape, a circular shape, or an elliptical shape.

The display device 10 may include a first area DR1, which is substantially flat, and second areas DR2, which extend from the left and right sides of the first area DR1. The second areas DR2 may be substantially flat or curved. In a case where the second areas DR2 are flat, the first area DR1 and the second areas DR2 may form an obtuse angle with each other. In a case where the second areas DR2 are curved, the second areas DR2 may have a predetermined curvature or a variable curvature.

FIG. 1 illustrates the second areas DR2 as extending from the left and right sides of the first area DR1, but the exemplary embodiments are not limited thereto. That is, the second areas DR2 may extend from only one of the left and right sides of the first area DR1. The second areas DR2 may also extend not only from the left and right sides, but also from the top and bottom sides of the first area DR1. In the description that follows, it is assumed that the second areas DR2 are disposed along the left and right edges of the display device 10.

Figure 6:
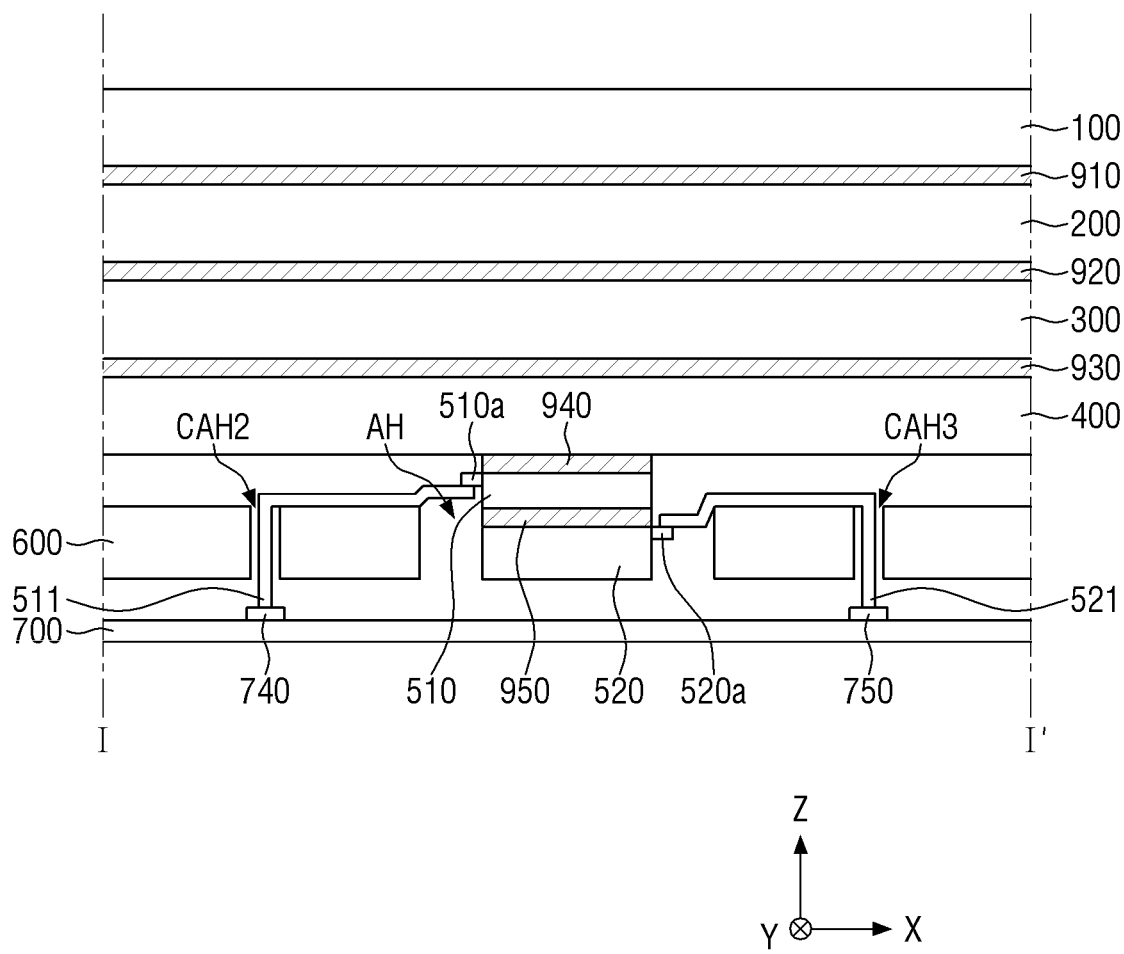
FIG. 6 is an exemplary cross-sectional view taken along a sectional line I-I' of FIGS. 3, 4, and 5.

The cover window 100 may be disposed on the display panel 300 to cover the top surface of the display panel 300. Accordingly, the cover window 100 may protect the top surface of the display panel 300. As illustrated in FIG. 6, the cover window 100 may be attached to the touch sensing device 200 via a first adhesive member 910. The first adhesive member 910 may be an optically clear adhesive (OCA) or an optically clear resin (OCR).

The cover window 100 may include a light-transmitting portion DA100, which corresponds to the display panel 300, and a light-blocking portion NDA100, which corresponds to the rest of the display device 10. The cover window 100 may be disposed in the first area DR1 and the second areas DR2. The light-transmitting portion DA100 may be disposed in parts of the first area DR1 and the second areas DR2. The light-blocking portion NDA100 may be formed to be opaque. In a case where the light-blocking portion NDA100 does not display an image, the light-blocking portion NDA100 may be formed as a decorative layer that can be seen by a user. For example, a company's logo such as SAMSUNG® or a string of various characters or letters may be patterned into the light-blocking portion NDA100. Also, holes HH, which are for exposing a front camera, a front speaker, an infrared (IR) sensor, an iris recognition sensor, and an illumination sensor, may be formed in the light-blocking portion NDA100, but the exemplary embodiments are not limited thereto. For example, some or all of the front camera, the front speaker, the IR sensor, the iris recognition sensor, and the illumination sensor may be integrated in the display panel 300, in which case, some or all of the holes HH may not be provided.

The cover window 100 may be formed of glass, sapphire, and/or plastic. The cover window 100 may be formed to be rigid or flexible.

The touch sensing device 200 may be disposed between the cover window 100 and the display panel 300. The touch sensing device 200 may be disposed in the first area DR1 and the second areas DR2. Accordingly, touch input from the user can be detected not only in the first area DR1, but also in the second areas DR2.

As illustrated in FIG. 6, the touch sensing device 200 may be attached to the bottom surface of the cover window 100 via the first adhesive member 910. A polarizing film may be added to the top of the touch sensing device 200 to prevent or reduce the degradation of visibility that may be caused by the reflection of external light. In this case, the polarizing film may be attached to the bottom surface of the cover window 100 via the first adhesive member 910.

The touch sensing device 200, which is a device for detecting the location of touch input from the user, may be implemented as being of a capacitive type such as a self-capacitance type or a mutual capacitance type. In a case where the touch sensing device 200 is implemented as being of the self-capacitance type, the touch sensing device 200 may include only touch driving electrodes. In a case where the touch sensing device 200 is implemented as being of the mutual capacitance type, the touch sensing device 200 may include touch driving electrodes and touch sensing electrodes. In the description that follows, it is assumed that the touch sensing device 200 is of the mutual capacitance type.

The touch sensing device 200 may be formed as a panel or a film. In this case, the touch sensing device 200 may be attached to a thin-film encapsulation film of the display panel 300 via a second adhesive member 920, as illustrated in FIG. 6. The second adhesive member 920 may be an OCA or an OCR.

The touch sensing device 200 may be formed in one integral body with the display panel 300. In this case, the touch driving electrodes and the touch sensing electrodes of the touch sensing device 200 may be formed on the thin-film encapsulation film of the display panel 300 or on an encapsulation substrate or film covering a light-emitting element layer of the display panel 300.

Figure 3:
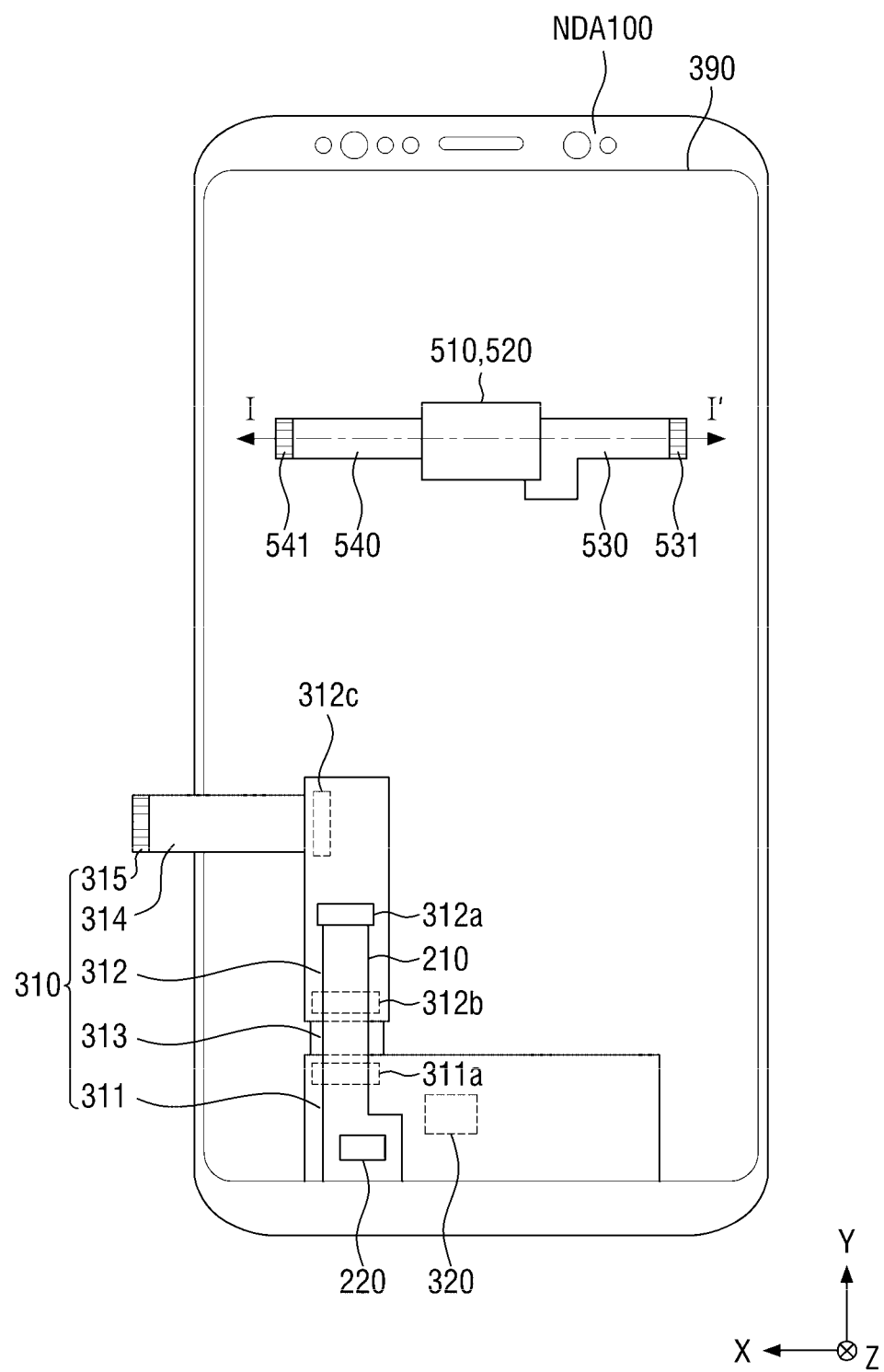
FIG. 3 is a bottom view illustrating examples of a cover window, a touch circuit board, a display panel, a display circuit board, a panel bottom member, a first sound generating device, a second sound generating device, a first sound circuit board, and a second sound circuit board of FIG. 2.

The touch circuit board 210 may be attached to one side of the touch sensing device 200. Specifically, one end of the touch circuit board 210 may be attached to pads provided on one side of the touch sensing device 200 via an anisotropic conductive film. As illustrated in FIG. 3, a touch connecting portion may be provided at the other end of the touch circuit board 210 and may be connected to a touch connector 312a of the display circuit board 310. The touch circuit board 210 may be a flexible printed circuit board.

The touch driving unit 220 may apply touch driving signals to the touch driving electrodes of the touch sensing device 200, may detect sensing signals from the touch sensing electrodes of the touch sensing device 200, and may calculate or detect the location of touch input from the user by analyzing the detected sensing signals. The touch driving unit 220 may be formed as an integrated circuit and may be mounted on the touch circuit board 210.

The display panel 300 may be disposed below the touch sensing device 200. The display panel 300 may be disposed to overlap with the light-transmitting portion 100DA of the cover window 100. The display panel 300 may be disposed in the first area DR1 and the second areas DR2. As a result, an image from the display panel 300 can be seen in the first area DR1 and in the second areas DR2.

The display panel 300 may be a light-emitting display panel including light-emitting elements. For example, the display panel 300 may be an organic light-emitting diode (OLED) display panel using OLEDs, a micro-light-emitting diode (mLED) display panel using mLEDs, or a quantum-dot light-emitting diode (QLED) display panel using QLEDs or be a panel using other types of light emitting elements. In the description that follows, it is assumed that the display panel 300 is an OLED display panel as illustrated in FIG. 23.

Figure 23:
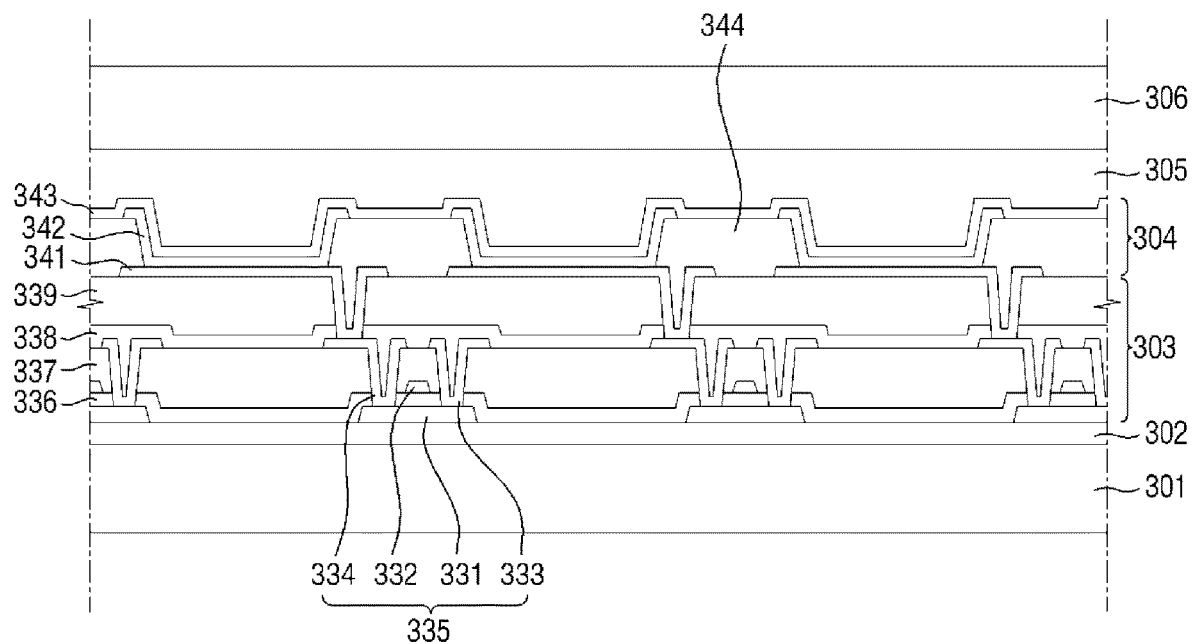
FIG. 23 is a cross-sectional view illustrating a display area of the display panel.

Referring to FIG. 23, a display area DA of the display panel 300 is an area in which a light-emitting element layer 304 is formed and an image is displayed, and a non-display area NDA of the display panel 300 is an area which is on the periphery of the display area DA.

The display panel 300 may include a supporting substrate 301, a flexible substrate 302, a thin-film transistor (TFT) layer 303, the light-emitting element layer 304, an encapsulation layer 305, and a barrier film 306.

The flexible substrate 302 is disposed on the supporting substrate 301. The supporting substrate 301 and the flexible substrate 302 may include a polymer material having flexibility. For example, the supporting substrate 301 and the flexible substrate 302 may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof.

The TFT layer 303 is formed on the flexible substrate 302. The TFT layer 303 includes TFTs 335, a gate insulating film 336, an interlayer insulating film 337, a passivation film 338, and a planarization film 339.

A buffer film may be formed on the flexible substrate 302. The buffer film may be formed on the flexible substrate 302 to protect the TFTs 335 and the light-emitting elements against moisture that may penetrate the supporting substrate 301 and the flexible substrate 302, which are susceptible to moisture. The buffer film may consist of a plurality of inorganic films that are alternately stacked. For example, the buffer film may be formed as a multilayer film in which at least one of a silicon oxide (SiOx) film and a silicon nitride (SiNx) film is alternately stacked. The buffer layer may not be provided.

The TFTs 335 are formed on the buffer film. Each of the TFTs 335 includes an active layer 331, a gate electrode 332, a source electrode 333, and a drain electrode 334. FIG. 23 illustrates the TFTs 335 as having a top gate structure in which the gate electrode 332 is disposed above the active layer 331, but the exemplary embodiments are not limited thereto. That is, the TFTs 335 may have a bottom gate structure in which the gate electrode 332 is disposed below the active layer 331 or a double gate structure in which the gate electrode 332 is disposed both above and below the active layer 331.

The active layer 331 is formed on the buffer film. The active layer 331 may be formed of a silicon-based semiconductor material or an oxide-based semiconductor material. A light-shielding layer for blocking external light incident on the active layer 331 may be formed between the buffer layer and the active layer 331.

A gate insulating film 336 may be formed on the active layer 331. The gate insulating film 316 may be formed as an inorganic film such as, for example, a silicon oxide film, a silicon nitride film, or a multilayer film thereof.

The gate electrode 332 and a gate line may be formed on the gate insulating film 316. The gate electrode 332 and the gate line may be formed as single- or multilayer films using molybdenum (Mo), aluminum (Al), chromium (Cr), gold (Au), titanium (Ti), nickel (Ni), neodymium (Ne), copper (Cu), or an alloy thereof.

The interlayer insulating film 337 may be formed on the gate electrode 332 and the gate line. The interlayer insulating film 337 may be formed as an inorganic film such as, for example, a silicon oxide film, a silicon nitride film, or a multilayer film thereof.

The source electrode 333, the drain electrode 334, and a data line may be formed on the interlayer insulating film 337. The source electrode 333 and the drain electrode 334 may be connected to the active layer 331 through contact holes penetrating the gate insulating film 336 and the interlayer insulating film 337. The source electrode 333, the drain electrode 334, and the data line may be formed as single- or multilayer films using Mo, Al, Cr, Au, Ti, Ni, Ne, Cu, or an alloy thereof.

The passivation film 338 may be formed on the source electrode 33, the drain electrode 334, and the data line to insulate the TFTs 335. The passivation film 338 may be formed as an inorganic film such as, for example, a silicon oxide film, a silicon nitride film, or a multilayer film thereof.

The planarization film 339 may be formed on the passivation film 338 to planarize height differences formed by the TFTs 335. The planarization film 339 may be formed as an organic film using an acrylic resin, an epoxy resin, a phenolic resin, a polyamide resin, or a polyimide resin.

The light-emitting element layer 304 is formed on the TFT layer 303. The light-emitting element layer 304 includes the light-emitting elements and a pixel-defining film 344.

The light-emitting elements and the pixel-defining film 344 are formed on the planarization film 339. The light-emitting elements may be OLEDs. In this case, each of the light-emitting elements may include an anode electrode 341, a light-emitting layer 342, and a cathode electrode 343.

The anode electrode 341 may be formed on the planarization film 339. The anode electrode 341 may be connected to the source electrode 333 through a contact hole penetrating the passivation film 338 and the planarization film 339.

The pixel-defining film 344 may be formed to cover the edges of the anode electrode 341 to define a corresponding pixel. That is, the pixel-defining film 344 may define each pixel. Each pixel may be a region in which the anode electrode 341, the light-emitting layer 342, and the cathode electrode 343 are sequentially stacked and holes from the anode electrode 341 and electrons from the cathode electrode 343 are combined in the light-emitting layer 342 to emit light.

The light-emitting layer 342 may be formed on the anode electrode 341 and the pixel-defining film 344. The light-emitting layer 342 may be an organic light-emitting layer. The light-emitting layer 342 may emit or generate one of red light, green light, and blue light. The peak wavelength of the red light may range from about 620 nm to 750 nm, the peak wavelength of the green light may range from about 495 nm to 570 nm, and the peak wavelength of the blue light may range from about 450 nm to 495 nm. The light-emitting layer 342 may be a white light-emitting layer to emit or generate white light. In this case, the light-emitting layer 342 may have a stack of red, green, and blue light-emitting layers and may be a common layer formed commonly for all pixels. Also, in this case, the display panel 300 may further include color filters for displaying red, green, and blue colors.

The light-emitting layer 342 may include a hole transport layer, an emission layer, and an electron transport layer. The light-emitting layer 342 may have a tandem structure with two or more stacks, in which case, a charge generating layer may be formed between the stacks.

The cathode electrode 343 may be formed on the light-emitting layer 342. The cathode electrode 343 may be formed to cover the light-emitting layer 342. The cathode electrode 343 may be a common layer formed commonly for all pixels.

In a case where the light-emitting element layer 304 is formed as a top emission-type light-emitting element layer, the anode electrode 341 may be formed of a metal material with high reflectance such as a stack of Al and Ti (e.g., Ti/Al/Ti), a stack of Al and ITO (e.g., ITO/Al/ITO), a silver (Ag)-palladium (Pd)-copper (Cu) (APC) alloy, or a stack of an APC alloy and ITO (e.g., ITO/APC/ITO), and the cathode electrode 343 may be formed of a transparent conductive oxide (TCO) material such as ITO or IZO that can transmit light therethrough or a semi-transmissive conductive material such as magnesium (Mg), Ag, or an alloy thereof. In a case where the cathode electrode 343 is formed of a semi-transmissive conductive material, the emission efficiency of the light-emitting element layer 304 may be improved due to a micro-cavity effect.

In a case where the light-emitting element layer 304 is formed as a bottom emission-type light-emitting element layer, the anode electrode 341 may be formed of a TCO material such as ITO or IZO or a semi-transmissive conductive material such as Mg, Ag, or an alloy thereof, and the cathode electrode 343 may be formed of a metal material with high reflectance such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO). In a case where the anode electrode 341 is formed of a semi-transmissive conductive material, the emission efficiency of the light-emitting element layer 304 may be improved due to a micro-cavity effect.

The encapsulation layer 305 is formed on the light-emitting element layer 304. The encapsulation layer 305 prevents or reduces the penetration of oxygen or moisture into the light-emitting layer 342 and the cathode electrode 343. The encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation layer 305 may further include at least one organic film. The organic layer may be formed to a sufficient thickness to prevent or reduce particles from entering the light-emitting layer 342 and the cathode electrode 343 through the encapsulation layer 305. The organic film may include one of epoxy, acrylate, and urethane acrylate.

The display circuit board 310 may be attached to one side of the display panel 300. Specifically, one end of the display circuit board 310 may be attached to pads provided on one side of the display panel 300 via an anisotropic conductive film. The display circuit board 310 may be bent toward the bottom surface of the display panel 300. The touch circuit board 210 may also be bent toward the bottom surface of the display panel 300. As a result, the touch connecting portion provided at the touch circuit board 210 may be connected to the touch connector 312a of the display circuit board 310. The display circuit board 310 will be described later with reference to FIGS. 3, 4, and 5.

The display driving unit 320 outputs or transmits, via the display circuit board 310, signals and voltages for driving the display panel 300. The display driving unit 320 may be formed as an integrated circuit and may be mounted on the display circuit board 310, but the exemplary embodiments are not limited thereto. For example, the display driving unit 320 may be attached directly to the display panel 300, in which case, the display driving unit 320 may be attached to the top surface or the bottom surface of the display panel 300.

The panel bottom support 400 may be disposed below the display panel 300, as illustrated in FIG. 6. The panel bottom support 400 may be attached to the bottom surface of the display panel 300 via a third adhesive member 930. The third adhesive member 930 may be an OCA or an OCR.

The panel bottom support 400 may include at least one of a light-absorbing member for absorbing incident light from the outside, a buffer member for absorbing shock from the outside, a heat dissipation member for effectively releasing heat from the display panel 300, and a light-shielding layer for blocking incident light from the outside.

The light-absorbing member may be disposed below the display panel 300. The light-absorbing member blocks the transmission of light and thus prevents or reduces the elements disposed therebelow, i.e., the first sound generating device 510, the second sound generating device 520, and the display circuit board 310, from becoming visible from above the display panel 300. The light-absorbing member may include a light-absorbing material such as a black pigment or dye.

The buffer member may be disposed below the light-absorbing member. The buffer member absorbs shock from the outside and thus prevents or reduces the display panel 300 from being damaged due to impacts and the like. The buffer member may be formed as a single layer or as multiple layers. For example, the buffer member may include a polymer resin such as polyurethane, polycarbonate, polypropylene, or polyethylene or an elastic material such as a sponge obtained by foam-molding rubber, a urethane-based material or an acrylic material. The buffer member may be a cushion layer.

The heat dissipation member may be disposed below the buffer member. The heat dissipation member may include a first heat dissipation layer including graphite or carbon nanotubes and a second heat dissipation layer formed as a thin metal film using a metal having excellent or high thermal conductivity such as Cu, Ni, ferrite, or Ag.

The first and second sound generating devices 510 and 520 may be disposed below the panel bottom support 400. The first and second sound generating devices 510 and 520 may completely or partially overlap each other vertically. In this case, the first sound generating device 510 may be attached to the bottom surface of the panel bottom support 400, and the second sound generating device 520 may be attached to the bottom surface of the first sound generating device 510. The first sound generating device 510 may be attached to the bottom surface of the panel bottom support 400 via a fourth adhesive member 940, and the second sound generating device 520 may be attached to the bottom surface of the first sound generating device 510 via a fifth adhesive member 950. The fourth adhesive member 940 and the fifth adhesive member 950 may be pressure sensitive adhesives (PSAs).

Figure 24:
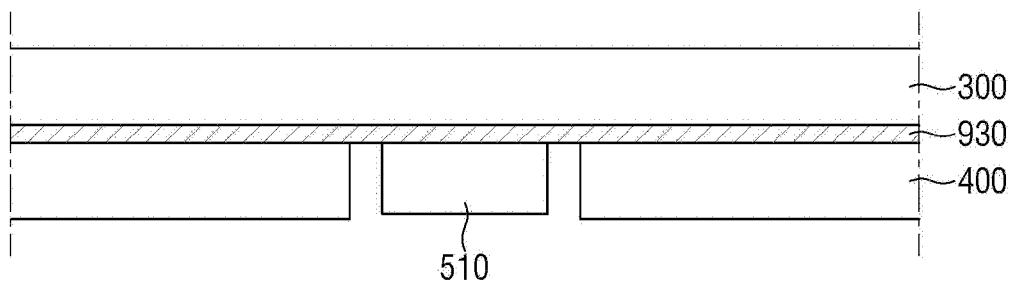
FIG. 24 is a cross-sectional view illustrating a panel bottom support and the first sound generating device.

In a case where the first sound generating device 510 is disposed on the heat dissipation member of the panel bottom support 400, the first or second heat dissipation layer of the heat dissipation member may break or be damaged due to the vibration of the first sound generating device 510. Accordingly, the heat dissipation member may be removed in the region where the first sound generating device 510 is disposed, and the first sound generating device 510 may be disposed on the buffer member. As illustrated in FIG. 24, the panel bottom support 400 may be removed in the region where the first sound generating device 510 is disposed, and the first sound generating device 510 may be disposed on the bottom surface of the display panel 300.

The first and sound generating devices may take the form of a speaker, vibrator, actuator or any other device that can generate vibration in response to an acoustic signal. Some specific examples of the type of sound generating devices that may be employed include those discussed herein. For example, the first sound generating device 510 may include a piezoelectric actuator. In this case, the first sound generating device 510 may vibrate by applying an alternating current (AC) voltage to the piezoelectric actuator so as for the piezoelectric actuator to contract and expand. Due to the vibration of the first sound generating device 510, the display panel 300 may vibrate vertically to output sounds.

The second sound generating device 520 may be an eccentric rotating motor (ERM) or a linear resonant actuator (LRA). An ERM is driven by a direct current (DC) voltage, and an LRA may be driven by an AC voltage. In a case where the second sound generating device 520 is implemented as an LRA, the second sound generating device 520 may vibrate by pressing a mass connected to a spring via a voice coil in response to an AC voltage being applied. As the second sound generating device 520 vibrates, the display panel 300 may vibrate vertically to output sounds. As the second sound generating device 520 vibrates, the display panel 300 may vibrate to provide haptic feedback to the user.

In a case where the first sound generating device 510 is a piezoelectric actuator and the second sound generating device 520 is an LRA, the first sound generating device 510 may have a higher sound pressure level than the second sound generating device 520 in a high frequency range, and the second sound generating device 520 may have a higher sound pressure level than the first sound generating device 510 in a low frequency range. Here, the low frequency range refers to a range of frequencies of 1 kHz or lower, and the high frequency range refers to a range of frequencies higher than 1 kHz. Since sounds are generated using the first sound generating device 510, which has a high sound pressure level in the high frequency range, and using the second sound generating device 520, a high sound level can be provided for both the high frequency range and the low frequency range. The second sound generating device 520 may vibrate at a higher amplitude when providing haptic feedback to the user than when outputting sounds.

The first sound generating device 510 may be connected to the first sound circuit board 530, and the second sound generating device 520 may be connected to the second sound circuit board 540. Specifically, one end of the first sound generating board 530 may be connected to a first sound pad area provided at at least one side of the first sound generating device 510, and one end of the second sound generating board 540 may be connected to a second sound pad area provided at at least one side of the second sound generating device 520.

The first sound circuit board 530 may be connected to a first sound connector 740 of the main circuit board 700. As a result, the first sound generating device 510 may be connected to a first sound driving unit 760 of the main circuit board 700. Accordingly, the first sound generating device 510 can vibrate according to first and second driving voltages from the first sound driving unit 760 and can thus output sounds.

The second sound circuit board 540 may be connected to the main circuit board 700 through a second through hole CAH2 of the middle frame 600. As a result, the second sound generating device 520 may be connected to a second sound driving unit 770 of the main circuit board 700.

Accordingly, the second sound generating device 520 can vibrate according to an AC voltage from the second sound driving unit 770 and can thus output sounds.

The middle frame 600 may be disposed below the panel bottom support 400. The middle frame 600 may include a synthetic resin, a metal, or both.

A first camera hole CMH1 in which a camera device 720 is inserted, a battery hole BH which is for releasing heat from a battery, a first through hole CAH1 that the first sound circuit board 530 passes through, the second through hole CAH2 that the second sound circuit board 540 passes through, and a third through hole CAH3 that a second connection cable 314 connected to the display circuit board 310 passes through may be formed in the middle frame 600. Also, a receiving hole AH for accommodating the first and second sound generating devices 510 and 520 may be formed in the middle frame 600. The width of the receiving hole AH is greater than the width of the first or second sound generating device 510 or 520. The receiving hole AH may be formed in one integral body with the battery hole BH.

To minimize or reduce the influence of heat generated by the second sound generating device 520 on the display panel 300, the second sound generating device 520 may be connected to the first heat dissipation layer and/or the second heat dissipation layer of the panel bottom support 400. In a case where the second sound generating device 520 overlaps with the battery hole BH in which a battery may be disposed, it may be difficult to properly release heat from the second sound generating device 520 due to the heat from the battery. Thus, the second sound generating device 520 may preferably be disposed not to overlap with the battery hole BH.

A waterproof member 610 may be disposed along the edges of the middle frame 600. The waterproof member 610 may be attached to the top surface of the panel bottom support 400 and the bottom surface of the middle frame 600, and as a result, the penetration of moisture or dust between the display panel 300 and the middle frame 600 can be prevented or reduced by the waterproof member 400. That is, a display device 10 that is waterproof and dustproof can be provided.

Specifically, the waterproof member 610 may include a base film, a first adhesive film disposed on one surface of the base film, and a second adhesive film disposed on the other surface of the base film. The base film may include PET, PET and a cushion layer, or polyethylene (PE) foam. The first and second adhesive films may be PSAs. The first adhesive film may be attached to the bottom surface of the panel bottom support 400, and the second adhesive film may be attached to the top surface of the middle frame 600.

The main circuit board 700 may be disposed below the middle frame 600. The main circuit board 700 may be a printed circuit board or a flexible printed circuit board.

The main circuit board 700 may include a main processor 710, the camera device 720, a main connector 730, the first sound connector 740, a second sound connector 750, the first sound driving unit 760, and the second sound driving unit 770. The main processor 710 and the main connector 730 may be disposed on the bottom surface of the main circuit board 700 to face the lower cover 900. The camera device 720 may be disposed on both the top surface and the bottom surface of the main circuit board 700.

The main processor 710 may control all the functions of the display device 10. For example, the main processor 710 may output image data to the display driving unit 320 of the display circuit board 310 so as for the display panel 300 to display an image. Also, the main processor 710 may receive touch data from the touch driving unit 220, may determine the location of touch input from the user, and may execute an application corresponding to an icon displayed at the location of the touch input. Also, the main processor 710 may receive touch data from the touch driving unit 220 and may execute an application corresponding to an icon displayed at the location of touch input from the user according to the touch data.

Also, in order to cause the display panel 300 to vibrate and generate sounds using the first and second sound generating devices 510 and 520 in a sound output mode, the main processor 710 may output first sound data to the first sound driving unit 760 and second sound data to the second sound driving unit 770. Also, in order to cause the display panel 300 to vibrate and provide haptic feedback to the user using the second sound generating device 520 in a haptic mode, the main processor 710 may output haptic data to the second sound driving unit 770.

The main processor 710 may be an application processor a central processing unit, or a system chip, which consists of an integrated circuit.

The camera device 720 processes image frames provided by an image sensor in a camera mode, such as a still image or a moving image, and outputs or transmits the processed image frames to the main processor 710.

The second connection cable 314, which passes through the third through hole CAH3 of the middle frame 600, may be connected to the main connector 730 of the main circuit board 700. As a result, the main circuit board 700 can be electrically connected to the display circuit board 310 and the touch circuit board 210.

The first sound circuit board 530, which passes through the first through hole CAH1 of the middle frame 600, may be connected to the first sound connector 740, which is disposed on the top surface of the main circuit board 700. The second sound circuit board 540, which passes through the second through hole CAH2 of the middle frame 600, may be connected to the second sound connector 750, which is disposed on the top surface of the main circuit board 700.

The first sound driving unit 760 may receive the first sound data from the main processor 710. The first sound driving unit 760 may generate the first and second driving voltages based on the first sound data and may provide the first and second driving voltages to the first sound generating device 510 via the first sound connector 740 and the first sound circuit board 530. Accordingly, the first sound generating device 510 can vibrate and thus generate sounds.

The second sound driving unit 770 may receive the second sound data or the haptic data from the main processor 710, may generate an AC voltage based on the second sound data or the haptic data, and may provide the AC voltage to the second sound generating device 520 via the second sound connector 750 or the second sound circuit board 540. Accordingly, the second sound generating device 520 can vibrate and can thus output sounds or provide haptic feedback to the user.

Each of the first and second sound driving units 760 and 770 may include a digital signal processor (DSP) processing a digital signal such as the first sound data or the second sound data, a digital-to-analog converter (DAC) converting the digital signal processed by the DSP into an analog signal, and an amplifier (AMP) amplifying the analog signal provided by the DAC and outputting the amplified analog signal.

A mobile communication module, which can exchange wireless signals with at least one of a base station, an external terminal, and a server via a mobile communication network, may be further provided on the main circuit board 700. The wireless signals may include various types of data associated with the transmission/reception of audio signals, video call signals, or text/multimedia messages.

The lower cover 900 may be disposed below the middle frame 600 and the main circuit board 700. The lower cover 900 may be coupled or fixed to the middle frame 600. The lower cover 900 may form the bottom exterior of the display device 100. The lower cover 900 may include plastic and/or a metal.

A second camera hole CMH2, through which the camera device 720 may be inserted to protrude outwardly, may be formed in the lower cover 900. The location of the camera device 720 and the locations of the first and second camera holes CMH1 and CMH2 corresponding to the camera device 720 are not limited to what is shown in FIG. 2.

According to the exemplary embodiment of FIGS. 1 and 2, the display device 10 may provide sounds using the first and second sound generating devices 510 and 520, which are disposed below the display panel 300, and may also provide haptic feedback to the user by causing the second sound generating device 520 to vibrate or generate vibration. Accordingly, a front speaker can be eliminated from the front of the display device 10, and as a result, the display area at the front of the display device 10 can be increased.

In addition, according to the exemplary embodiment of FIGS. 1 and 2, since the first sound generating device 510 is formed as a piezoelectric actuator having a high sound pressure level in a high frequency range and the second sound generating device 520 is formed as an LRA having a high sound pressure level in a low frequency range, the display device 10 can provide the user with sounds having a high sound pressure level in both the low frequency range and the high frequency range.

Figure 4:
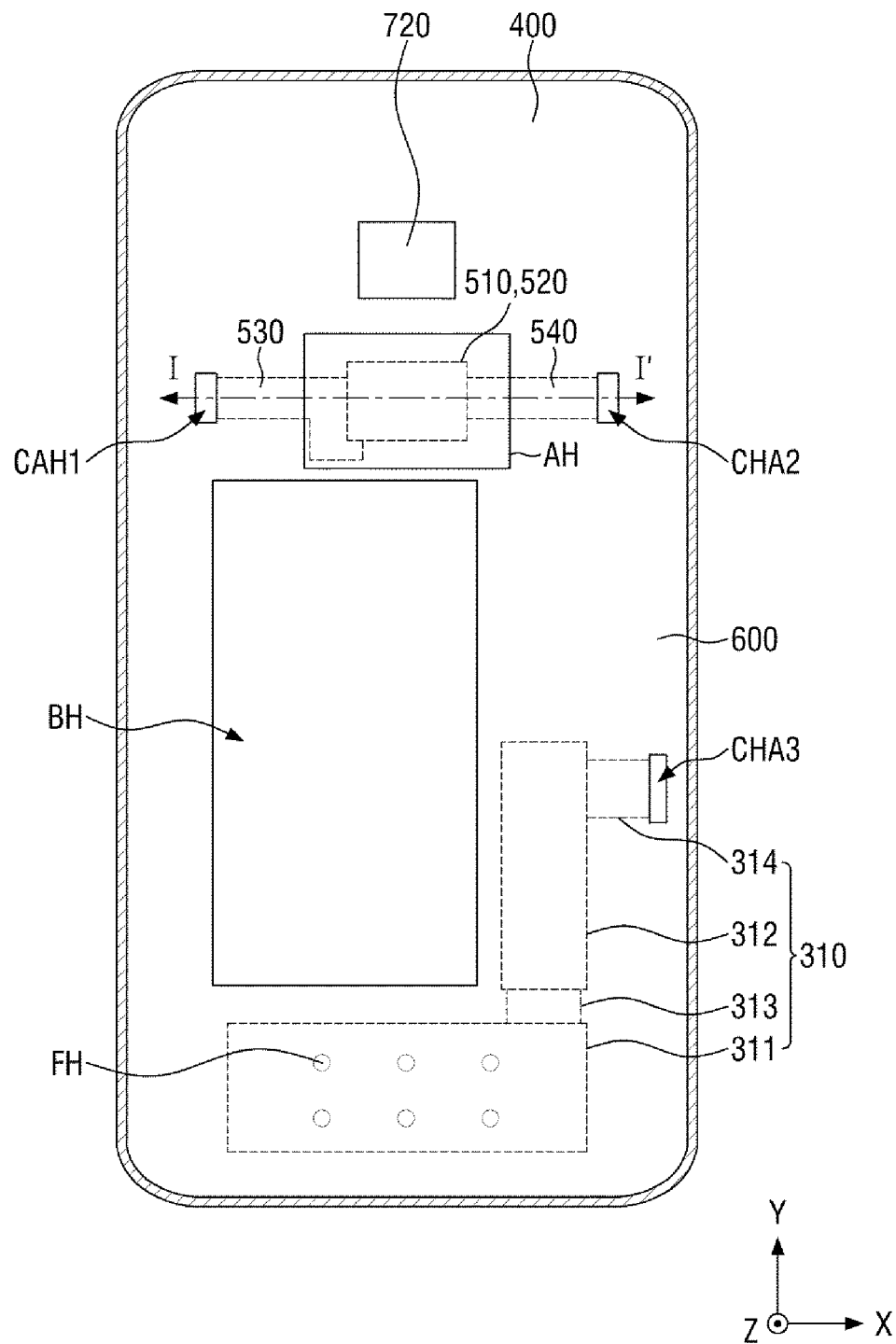
FIG. 4 is a plan view illustrating examples of the display circuit board, a second connection cable, the first sound generating device, the first sound circuit board, the second sound generating device, the second sound circuit board, and a middle frame of FIG. 2.
Figure 5:
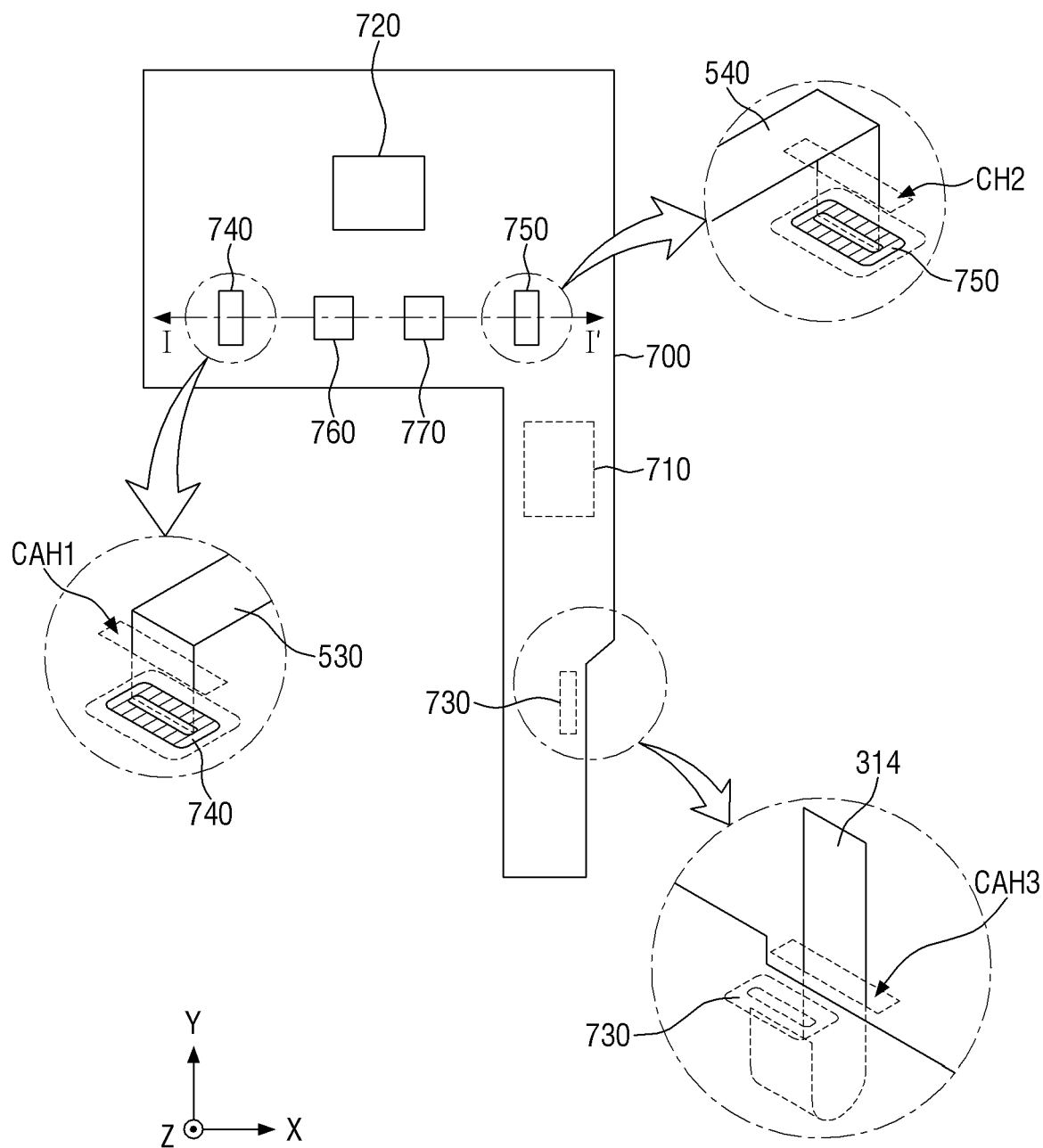
FIG. 5 is a plan view illustrating examples of the second connection cable, the first sound circuit board, the second sound circuit board, and a main circuit board of FIG. 2.

FIG. 3 is a bottom view illustrating examples of the cover window 100, the touch circuit board 210, the display panel 300, the display circuit board 310, the panel bottom support 400, the first sound generating device 510, the second sound generating device 520, the first sound circuit board 530, and the second sound circuit board 540 of FIG. 2. FIG. 4 is a plan view illustrating examples of the display circuit board 310, the second connection cable 314, the first sound generating device 510, the first sound circuit board 530, the second sound generating device 520, the second sound circuit board 540, and the middle frame 600 of FIG. 2. FIG. 5 is a plan view illustrating examples of the second connection cable 314, the first sound circuit board 530, the second sound circuit board 540, and the main circuit board 700 of FIG. 2

Hereinafter with reference to FIGS. 3, 4, and 5, the first sound circuit board 530 connected to the first sound generating device 510 and connected to the first sound connector 740 of the main circuit board 700, the second sound circuit board 540 connected to the second sound generating device 520 and connected to the second sound connector 750 of the main circuit board 700, and the second connection cable 314 connected to the display circuit board 310 and connected to the main connector 740 of the main circuit board 700 will be described.

Referring to FIGS. 3, 4, and 5, one end of the first sound circuit board 530 may be connected to the first sound pad area provided at at least one side of the first sound generating device 510. The first sound pad area may include a first pad electrode. A first sound connecting portion 531 may be provided at the other end of the first sound circuit board 530. The first sound connecting portion 531 of the first sound circuit board 530 may be connected to the first sound connector 740, which is disposed on the top surface of the main circuit board 700, through the first through hole CAH1 of the middle frame 600.

One end of the second sound circuit board 540 may be connected to the second sound pad area provided at at least one side of the second sound generating device 520. The second sound pad area may include a second pad electrode. A second sound connecting portion 541 may be provided at the other end of the second sound circuit board 540. The second sound connecting portion 541 of the second sound circuit board 540 may be connected to the second sound connector 750, which is disposed on the top surface of the main circuit board 700, through the second through hole CAH2 of the middle frame 600.

The display circuit board 310 may include a first circuit board 311, a second circuit board 312, and a first connection cable 313.

The first circuit board 311 may be attached to one side of the top or bottom surface of the display panel 300 and may be bent toward the bottom surface of the display panel 300. As illustrated in FIG. 4, the first circuit board 311 may be fixed into fixing holes FH, which are formed in the middle frame 600, by fixing members.

The first circuit board 311 may include the display driving unit 320 and a first connector 311a. The display driving unit 320 and the first connector 311a may be disposed on one surface of the first circuit board 311.

The first connector 311a may be connected to a first end of the first connection cable 313 connected to the second circuit board 312. As a result, the display driving unit 320 mounted on the first circuit boar 311 can be electrically connected to the second circuit board 312 via the first connection cable 313.

The second circuit board 312 may include the touch connector 312a, a first connection connector 312b, and a second connection connector 312c. The first and second connection connectors 312b and 312c may be disposed on one surface of the second circuit board 312, and the touch connector 312a may be disposed on the other surface of the second circuit board 312.

The touch connector 312a may be connected to the touch connecting portion provided at one end of the touch circuit board 210. As a result, the touch driving unit 220 can be electrically connected to the second circuit board 312.

The first connection connector 312b may be connected to a second end of the first connection cable 313 connected to the first circuit board 311. As a result, the display driving unit 320 mounted on the first circuit board 311 can be electrically connected to the second circuit board 312 via the first connection cable 313.

The second connection connector 312c may be connected to a first end of the second connection cable 314 connected to the main connector 730 of the main circuit board 700. As a result, the second circuit board 312 can be electrically connected to the main circuit board 700 via the second connection cable 314.

A connector connection portion 315 may be formed at a second end of the second connection cable 314. As illustrated in FIG. 4, the connector connection portion 315 of the second connection cable 314 may extend to the bottom of the middle frame 600 through the third through hole CAH3 of the middle frame 600. Also, as illustrated in FIG. 5, the connector connecting portion 315 of the second connection cable 314 passing through the third through hole CAH3 may extend to the bottom of the main circuit board 700 through the gap between the middle frame 600 and the main circuit board 700. Finally, as illustrated in FIG. 5, the connector connecting portion 315 of the second connection cable 314 may be connected to the main connector 730, which is disposed on the bottom surface of the main circuit board 700.

According to the exemplary embodiment of FIGS. 3, 4, and 5, the first sound circuit board 530, which is connected to the first sound generating device 510, may be connected to the first sound connector 740 of the main circuit board 700 through the first through hole CAH1 of the middle frame 600, and the second sound circuit board 540, which is connected to the second sound generating device 520, may be connected to the second sound connector 750 of the main circuit board 700 through the second through hole CAH2 of the middle frame 600. Accordingly, the first sound generating device 510 and the first sound driving unit 760 of the main circuit board 700 can be stably connected, and the second sound generating device 520 and the second sound driving unit 770 of the main circuit board 700 can be stably connected.

In addition, according to the exemplary embodiment of FIGS. 3, 4, and 5, the second connection cable 314, which is connected to the display circuit board 310, may extend to the bottom of the middle frame 600 through the third through hole CAH3 of the middle frame 600 and may thus be connected to the main connector 730 of the main circuit board 700. Accordingly, the display circuit board 310 and the main circuit board 700 can be stably connected.

FIG. 6 is an exemplary cross-sectional view taken along a sectional line I-I' of FIGS. 3, 4, and 5.

The cover window 100, the touch sensing device 200, the display panel 300, the panel bottom support 400, the first adhesive member 910, the second adhesive member 920, and the third adhesive member 930 have already been described in detail with reference to FIGS. 1 and 2, and thus, detailed descriptions thereof will be omitted to avoid redundancy.

Referring to FIG. 6, the first sound generating device 510 is disposed below the panel bottom support 400. The first sound generating device 510 may be attached to the bottom surface of the panel bottom support 400 via the fourth adhesive member 940. The fourth adhesive member 940 may be a PSA.

A first pad electrode 510a of the first sound generating device 510 may be disposed to protrude from at least one side of the first sound generating device 510. The first pad electrode 510a of the first sound generating device 510 may be connected to one end of the first sound circuit board 530. FIG. 6 illustrates the top surface of the first sound circuit board 530 as being connected to the bottom surface of the first pad electrode 510a, but the exemplary embodiments are not limited thereto. The bottom surface of the first sound circuit board 530 may be connected to the top surface of the first pad electrode 510a. The other end of the first sound circuit board 530 may be connected to the first sound connector 740, which is disposed on the top surface of the main circuit board 700, through the first through hole CAH1, which penetrates the middle frame 600.

The second sound generating device 520 may be disposed to overlap with the first sound generating device 510. The second sound generating device 520 may be disposed below the first sound generating device 510. The second sound generating device 520 may be attached to the bottom surface of the first sound generating device 510 via the fifth adhesive member 950. The fifth adhesive member 950 may be a PSA.

A second pad electrode 520a of the second sound generating device 520 may be disposed to protrude from one side of the second sound generating device 520. The second pad electrode 520a of the second sound generating device 520 may be connected to one end of the second sound circuit board 540. FIG. 6 illustrates the bottom surface of the second sound circuit board 540 as being connected to the top surface of the second pad electrode 520a, but the exemplary embodiments are not limited thereto. The top surface of the second sound circuit board 540 may be connected to the bottom surface of the second pad electrode 520a. The other end of the second sound circuit board 540 may be connected to the second sound connector 750, which is disposed on the top surface of the main circuit board 700, through the second through hole CAH2, which penetrates the middle frame 600.

The first and second sound generating devices 510 and 520 may be disposed in the receiving hole AH, which penetrates the middle frame 600. If the first and second sound generating devices 510 and 520 are not tall, a receiving groove, instead of the receiving hole AH, may be formed in the middle frame 600.

The first and second sound generating devices 510 and 520 may vibrate in a vertical direction (or the Z-axis direction). The first sound generating device 510 may vibrate in the vertical direction (or the Z-axis direction), and the second sound generating device 520 may vibrate in a horizontal direction (or the X- or Y-axis direction).

Figure 7:
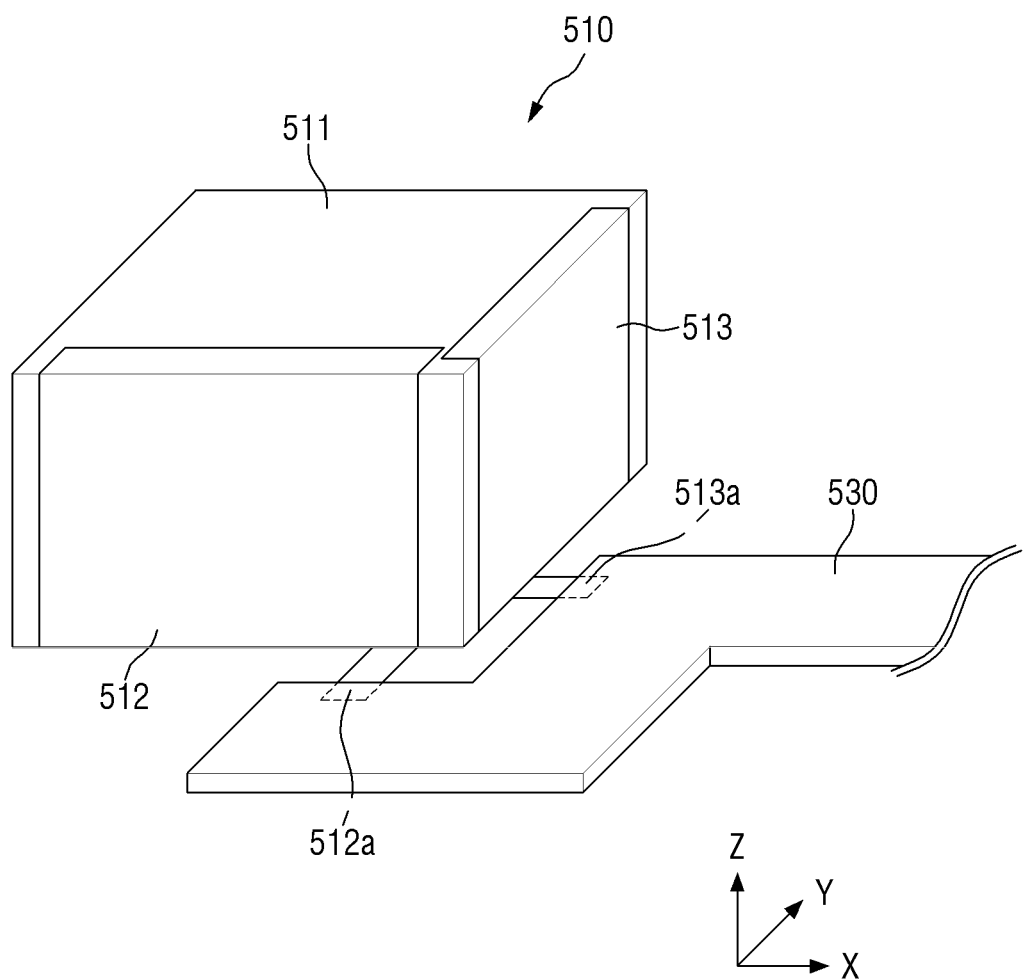
FIG. 7 is a perspective view of an example of the first sound generating device of FIG. 6.
Figure 8:
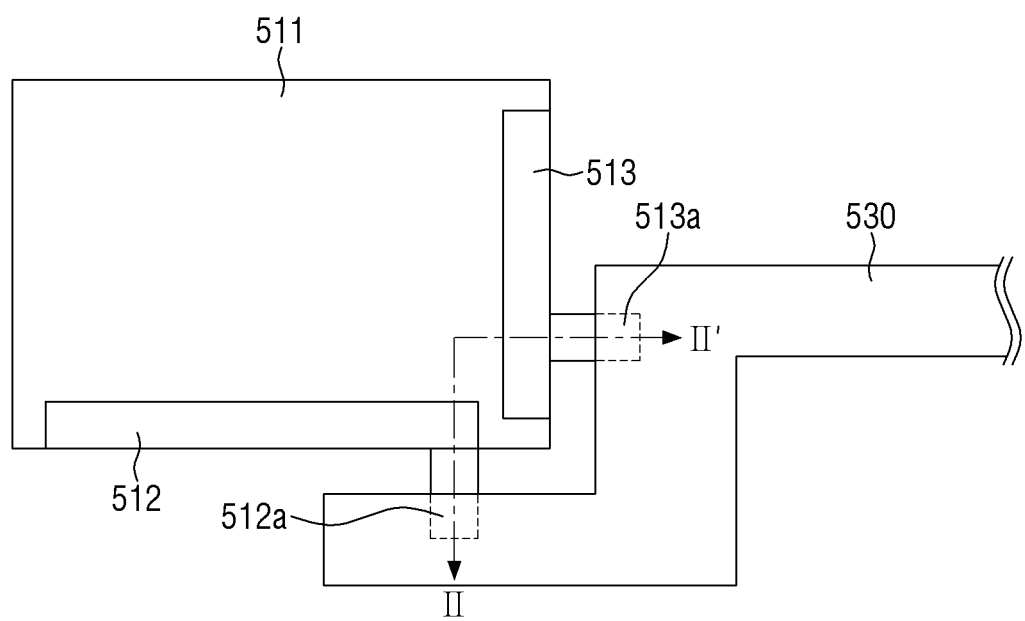
FIG. 8 is a plan view of the first sound generating device of FIG. 7.

FIG. 7 is a perspective view of an example of the first sound generating device 510 of FIG. 6. FIG. 8 is a plan view of the first sound generating device 510 of FIG. 7. FIG. 9 is a cross-sectional view taken along a sectional line II-II' of FIG. 8.

The first sound generating device 510 will hereinafter be described with reference to FIGS. 7, 8, and 9.

Referring to FIGS. 7, 8, and 9, the first sound generating device 510 may include a vibration layer 511, a first electrode 512, a second electrode 513, a first pad electrode 512a, and a second pad electrode 513a.

The first electrode 512 may include a first stem electrode 5121 and first branch electrodes 5122. The first stem electrode 5121 may be disposed on one side of the vibration layer 511. The first stem electrode 5121 may be disposed on more than one side of the vibration layer 511. The first stem electrode 5121 may be disposed on the top surface of the vibration layer 511. The first branch electrodes 5122 may be branched off from the first stem electrode 5121. The first branch electrodes 5122 may be disposed in parallel to one another.

The second electrode 513 may include a second stem electrode 5131 and second branch electrodes 5132. The second stem electrode 5131 may be disposed on another side of the vibration layer 511. The second stem electrode 5131 may be disposed on more than one side of the vibration layer 511 where the first stem electrode 5121 is not disposed. The second stem electrode 5131 may be disposed on the top surface of the vibration layer 511. The first and second stem electrodes 5121 and 5131 are spaced from each other. The second branch electrodes 5132 may be branched off from the second stem electrode 5131. The second branch electrodes 5132 may be disposed in parallel to one another.

The first branch electrodes 5122 and the second branch electrodes 5132 may be disposed substantially parallel to one another in the horizontal direction (or the X- or Y-axis direction). The first branch electrodes 5122 and the second branch electrodes 5132 may be alternately disposed in the vertical direction (or the Z-axis direction). That is, the first branch electrodes 5122 and the second branch electrodes 5132 may be disposed repeatedly in the order of a first branch electrode 5122, a second branch electrode 5132, a first branch electrode 5122, and a second branch electrode 5132 along the vertical direction (or the Z-axis direction).

The first pad electrode 512a may be connected to the first electrode 512. The first pad electrode 512a may protrude outwardly from the first stem electrode 5121, which is disposed on one side of the vibration layer 511.

The second pad electrode 513a may be connected to the second electrode 513. The second pad electrode 513 a may protrude outwardly from the second stem electrode 5131, which is disposed on the other side of the vibration layer 511.

The first and second pad electrodes 512a and 513a may be connected to lead lines or pad electrodes of a first sound circuit board 530. The lead lines or the pad electrodes of the first sound circuit board 530 may be disposed on the bottom surface of the first sound circuit board 530.

In a case where the first and second pad electrodes 512a and 513a protrude outwardly from different sides of the vibration layer 511, as illustrated in FIG. 7, the first sound circuit board 530 may be disposed on a side, other than a first side, of the first sound generating device 510, but the exemplary embodiments are not limited thereto. The first and second pad electrodes 512a and 513a may protrude outwardly from the same side of the vibration layer 511, in which case, the first sound circuit board 530 may be disposed on the first side of the first sound generating device 510.

Since the vibration layer 511 is fabricated at high temperature, the first and second electrodes 512 and 513 may be formed of a metal with a high melting point such as Ag or an alloy of Ag and Pd. In a case where the first and second electrodes 512 and 513 are formed of an alloy of Ag and Pd, the content of Ag in each of the first and second electrodes 512 and 513 may be greater than the content of Pd in each of the first and second electrodes 512 and 513.

The vibration layer 511 may be a piezoelectric actuator that is deformed by first and second driving voltages applied to the first and second electrodes 512 and 513, respectively. In this case, the vibration layer 511 may be one of a piezoelectric material such as a polyvinylidene difluoride (PVDF) film or lead zirconate titanate (PZT) and an electroactive polymer.

The vibration layer 511 may be disposed between the first branch electrodes 5122 and the second branch electrodes 5132. The vibration layer 511 contracts or expands depending on the difference between the first driving voltage applied to the first branch electrodes 5122 and the second driving voltage applied to the second branch electrodes 5132.

Specifically, as illustrated in FIG. 9, the polarity of the vibration layer 511 between the first branch electrodes 5122 and their respective underlying second branch electrodes 5132 may have an upward direction (illustrated as T). In this case, the vibration layer 511 may have a positive polarity in upper parts thereof adjacent to the first branch electrodes 5122 and a negative polarity in lower parts thereof adjacent to the second branch electrodes 5132. Also, the polarity of the vibration layer 511 between the second branch electrodes 5132 and their respective underlying first branch electrodes 5122 may have a downward direction (illustrated as ↓). In this case, the vibration layer 511 may have a negative polarity in the upper parts thereof adjacent to the first branch electrodes 5122 and a positive polarity in the lower parts thereof adjacent to the second branch electrodes 5132. The direction of the polarity of the vibration layer 511 may be determined by a poling process for applying an electric field to the vibration layer 511 using the first branch electrodes 5122 and the second branch electrodes 5132.

Figure 10A:
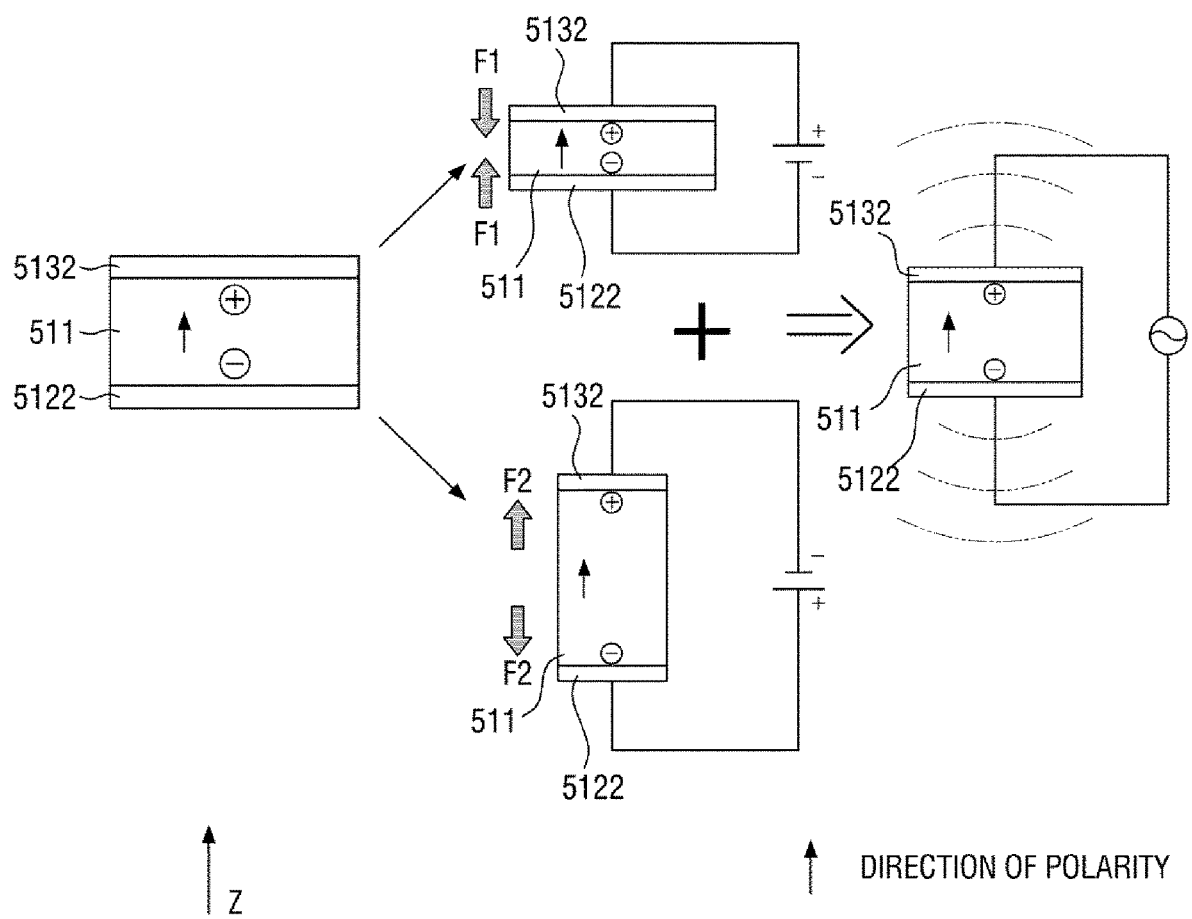
FIG. 10A is a schematic view illustrating how a vibration layer disposed between first and second branch electrodes of the first sound generating device vibrates.

FIG. 10A is a schematic view illustrating how a vibration layer disposed between first and second branch electrodes 5122 and 5132 of the first sound generating device 510 vibrates. FIGS. 10B and 10C are schematic views illustrating how the display panel 300 vibrates in response to the vibration of the first sound generating device 510.

When the direction of the polarity of the vibration layer 511 between the first branch electrodes 5122 and their respective underlying second branch electrodes 5132 is the upward direction (↑), as illustrated in FIG. 10A, the vibration layer 511 may contract in accordance with a first force F1 in response to a positive first driving voltage and a negative second driving voltage being applied to the first branch electrodes 5122 and the second branch electrodes 5132, respectively. The first force F1 may be a contraction force. On the other hand, in response to a negative first driving voltage and a positive second driving voltage being applied to the first branch electrodes 5122 and the second branch electrodes 5132, respectively, the vibration layer 511 may expand in accordance with a second force F2. The second force F2 may be an extension force.

When the direction of the polarity of the vibration layer 511 between the second branch electrodes 5132 and their respective underlying first branch electrodes 5122 is the downward direction (↓), the vibration layer 511 may expand in accordance with an extension force in response to a positive first driving voltage and a negative second driving voltage being applied to the first branch electrodes 5122 and the second branch electrodes 5132, respectively. On the other hand, in response to a negative first driving voltage and a positive second driving voltage being applied to the first branch electrodes 5122 and the second branch electrodes 5132, respectively, the vibration layer 511 may contract in accordance with a contraction force. The second force F2 may be an extension force.

According to the exemplary embodiment of FIG. 9, in a case where the first and second driving voltages applied to the first and second electrodes 512 and 513, respectively, alternately change from a positive polarity to a negative polarity, the vibration layer 511 repeatedly contracts and expands. As a result, the first sound generating device 510 vibrates.

The first sound generating device 510 is disposed on the bottom surface of the display panel 300. Thus, as the vibration layer 511 of the first sound generating device 510 contracts and expands, the display panel 300 vibrates vertically due to stress, as illustrated in FIGS. 10B and 10C. Since the display panel 300 is caused by the first sound generating device 510 to vibrate, the display device 10 can output sounds.

The second sound generating device 520 may be substantially the same as the first sound generating device 510 described above with reference to FIGS. 7, 8, 9, 10A, 10B, and 10C, and thus, a detailed description thereof will be omitted to avoid redundancy.

Figure 11:
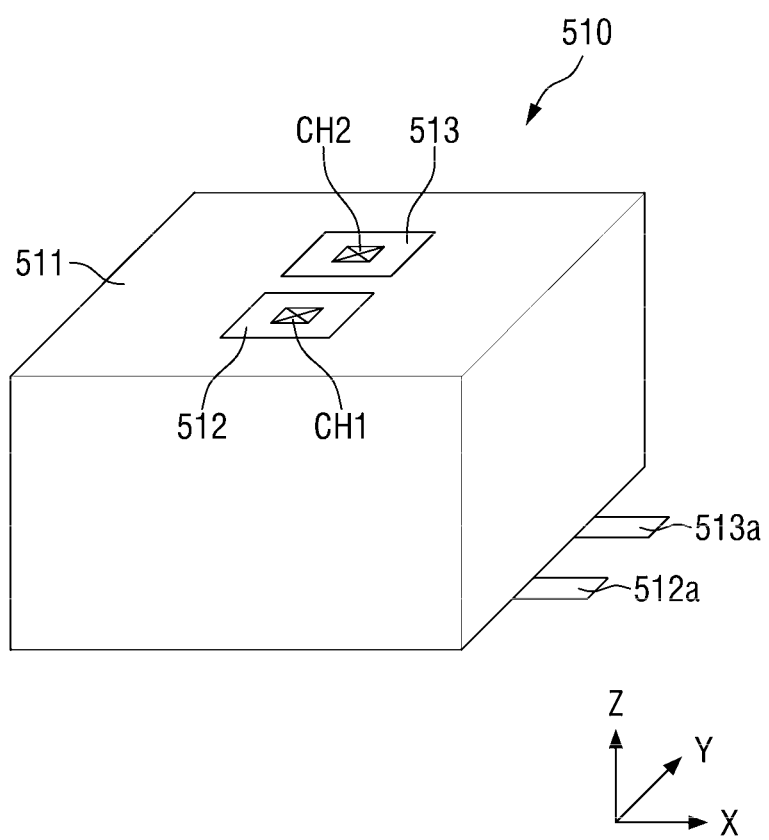
FIG. 11 is a perspective view of another example of the first sound generating device of FIG. 6.
Figure 12:
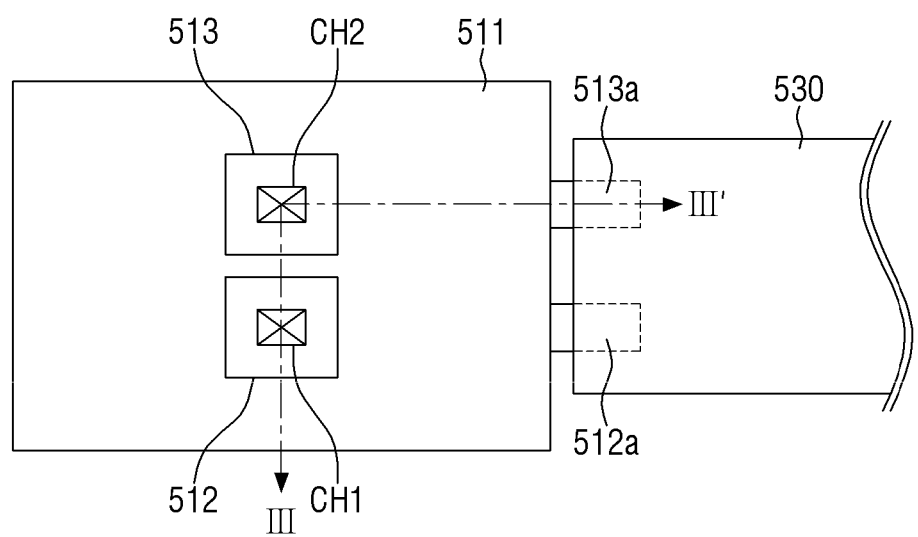
FIG. 12 is a plan view of the first sound generating device of FIG. 11.
Figure 13:
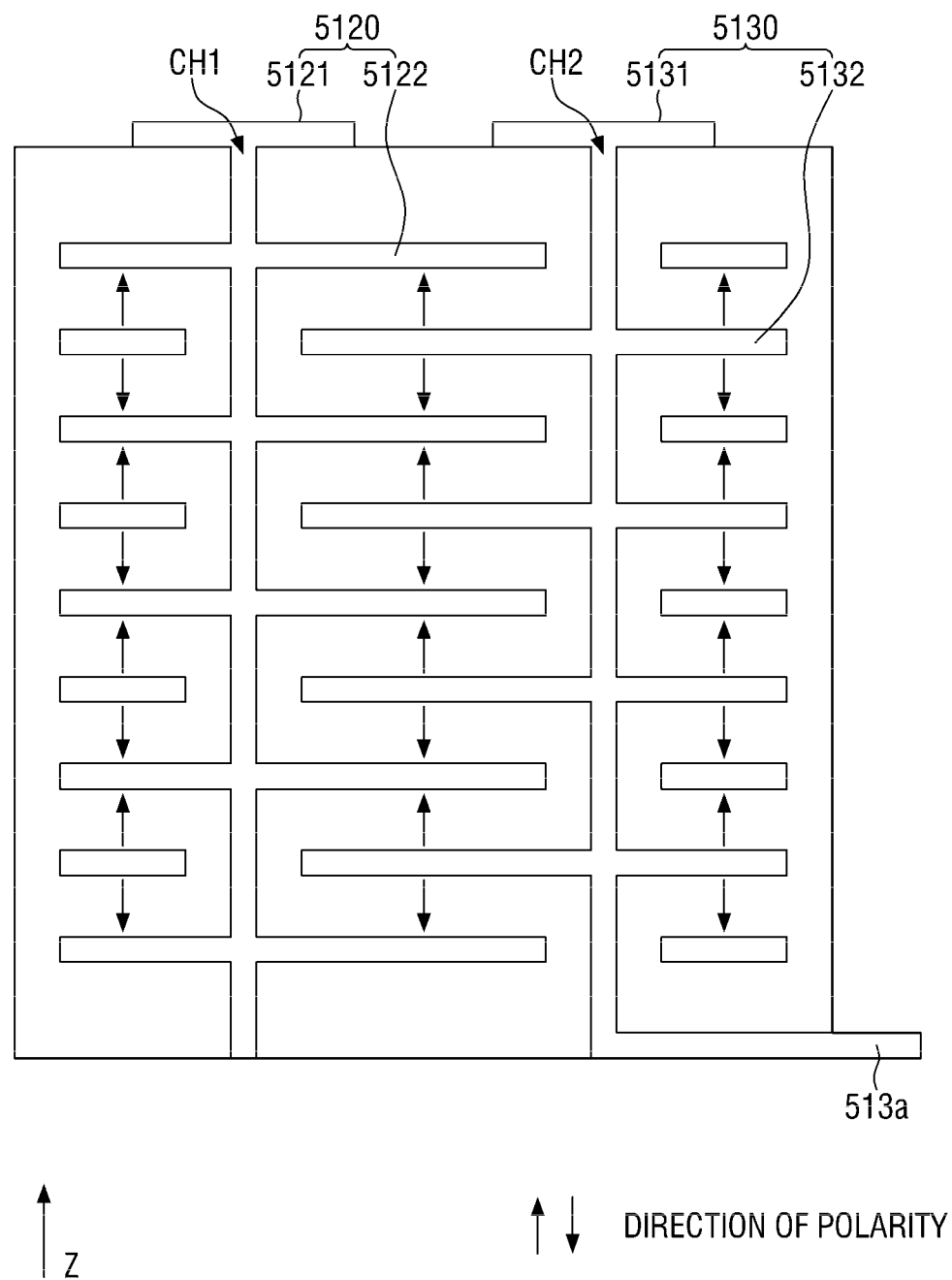
FIG. 13 is a cross-sectional view taken along a sectional line III-III' of FIG. 12.

FIG. 11 is a perspective view of another example of the first sound generating device of FIG. 6. FIG. 12 is a plan view of the first sound generating device of FIG. 11. FIG. 13 is a cross-sectional view taken along a sectional line III-III' of FIG. 12.

The exemplary embodiment of FIGS. 11, 12, and 13 differs from the exemplary embodiment of FIGS. 7, 8, and 9 in that a first stem electrode 5121 of a first electrode 512 is disposed in a first contact hole CH1 penetrating a vibration layer 511 and a second stem electrode 5131 of a second electrode 513 is disposed in a second contact hole CH2 penetrating the vibration layer 511. The exemplary embodiment of FIGS. 11, 12, and 13 will hereinafter be described focusing mainly on the differences with the exemplary embodiment of FIGS. 7, 8, and 9.

Referring to FIGS. 11, 12, and 13, the first contact hole CH1 is formed to penetrate the vibration layer 511, and the first stem electrode 5121 is disposed in the first contact hole CH1. The first stem electrode 5121 is arranged in a vertical direction (or a Z-axis direction), and second branch electrodes 5132 are arranged in a horizontal direction (or an X- or Y-axis direction). Since the vibration layer 511 cannot vibrate if the first stem electrode 5121 and the second branch electrodes 5132 are connected, the second branch electrodes 5132 are disposed to avoid the first stem electrode 5121 and thus not to be connected to the first stem electrode 5121.

The second contact hole CH2 is formed to penetrate the vibration layer 511, and the second stem electrode 5131 is disposed in the second contact hole CH2. The second stem electrode 5131 is arranged in the vertical direction (or the Z-axis direction), and first branch electrodes 5122 are arranged in the horizontal direction (or the X- or Y-axis direction). Since the vibration layer 511 cannot vibrate if the second stem electrode 5131 and the first branch electrodes 5122 are connected, the first branch electrodes 5122 are disposed to avoid the second stem electrode 5131 and thus not to be connected to the second stem electrode 5131.

A first pad electrode 512*a* may be connected to the first electrode 512. The first pad electrode 512*a* may protrude outwardly from the first stem electrode 5121, which is disposed on one side of the vibration layer 511.

A second pad electrode 513*a* may be connected to the second electrode 513. The second pad electrode 513*a* may protrude outwardly from the second stem electrode 5131, which is disposed on another side of the vibration layer 511.

The first and second pad electrodes 512*a* and 513*a* may be connected to lead lines or pad electrodes of the first sound circuit board 530. The lead lines or the pad electrodes of the first sound circuit board 530 may be disposed on the bottom surface of the first sound circuit board 530.

The second sound generating device 520 may be substantially the same as the first sound generating device 510 described above with reference to FIGS. 12, 13, and 13, and thus, a detailed description thereof will be omitted to avoid redundancy.

Figure 14:
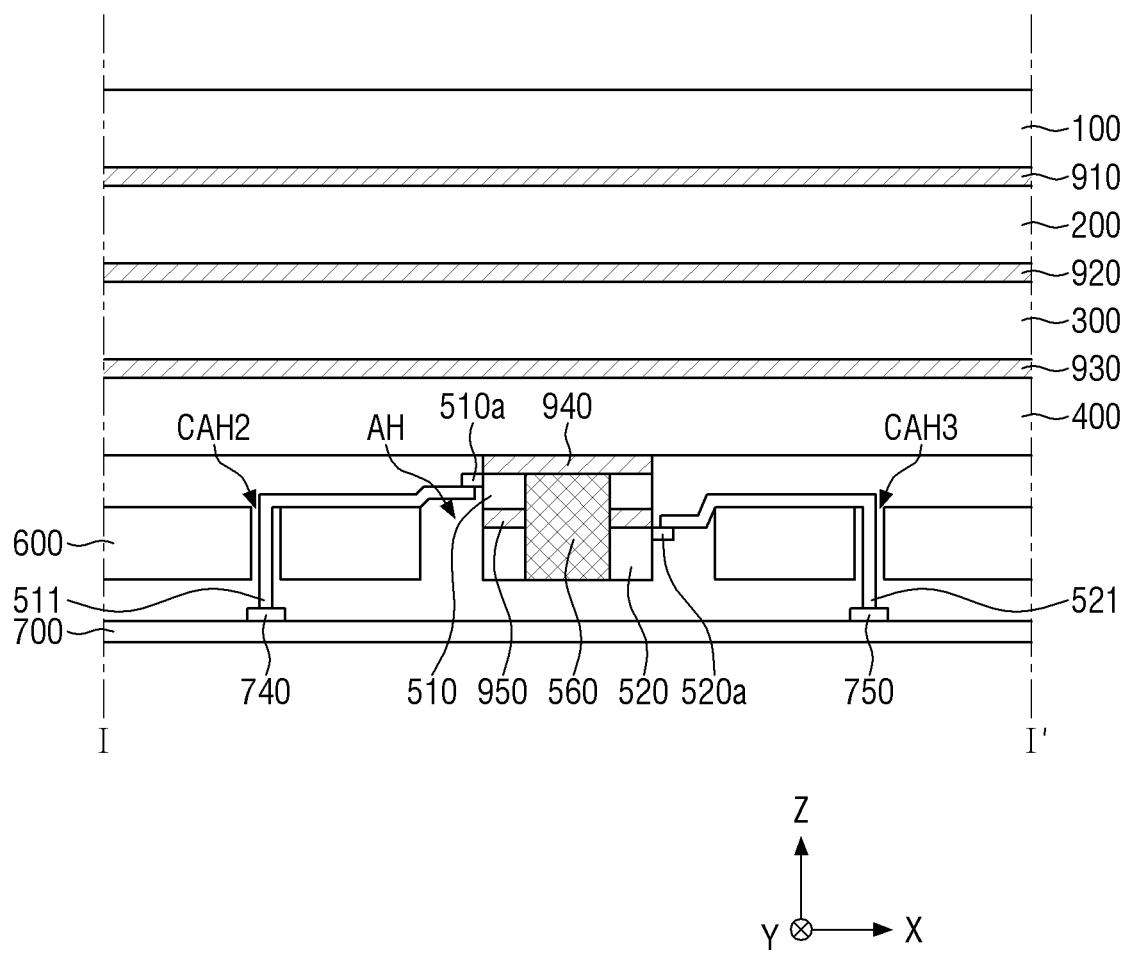
FIG. 14 is another exemplary cross-sectional view taken along the sectional line I-I' of FIGS. 3, 4, and 5.

FIG. 14 is another exemplary cross-sectional view taken along the sectional line I-I' of FIGS. 3, 4, and 5.

The exemplary embodiment of FIG. 14 differs from the exemplary embodiment of FIG. 6 in that a connecting member 560 is further provided to connect one side of the first sound generating device 510 and one side of the second sound generating device 520. The exemplary embodiment of FIG. 14 will hereinafter be described focusing mainly on the difference with the exemplary embodiment of FIG. 6.

Referring to FIG. 14, the connecting member 560 is disposed on a first side of the first sound generating device 510 and on a first side of the second sound generating device 520. The connecting member 560 may be attached to the first sides of the first and second sound generating devices 510 and 520 via an adhesive member. The connecting member 560 may be coupled to the first sides of the first and second sound generating devices 510 and 520 via a coupling member. The connecting member 560 may be attached to the first side of one of the first and second sound generating devices 510 and 520 via an adhesive member and may be coupled to the first side of the other sound generating device via a coupling member. Here, the adhesive member may be a PSA, and the coupling member may be a screw. The connecting member 560 may also be formed in one integral body with the second sound generating device 520.

FIG. 14 illustrates the connecting member 560 as connecting the first sides of the first and second sound generating devices 510 and 520, but the exemplary embodiments are not limited thereto. If the width, in the first direction (or the X-axis direction), of the first sound generating device 510 and the width, in the first direction (or the X-axis direction), of the second sound generating device 520 are substantially the same, the connecting member 560 may connect a side opposite to the first side of the first sound generating device 510 and a side opposite to the first side of the second sound generating device 520. If the width, in the second direction (or the Y-axis direction), of the first sound generating device 510 and the width, in the second direction (or the Y-axis direction), of the second sound generating device 520 are substantially the same, the connecting member 560 may connect a side not opposite to the first side of the first sound generating device 510 and a side not opposite to the first side of the second sound generating device 520.

According to the exemplary embodiment of FIG. 14, since the connecting member 560 connects at least one side of the first sound generating device 510 and at least one side of the second sound generating device 520, the first sound generating device 510 can vibrate along with the second sound generating device 520 when the second sound generating device 520 vibrates to provide haptic feedback to the user. Accordingly, the intensity of vibration can be raised.

Figure 15:
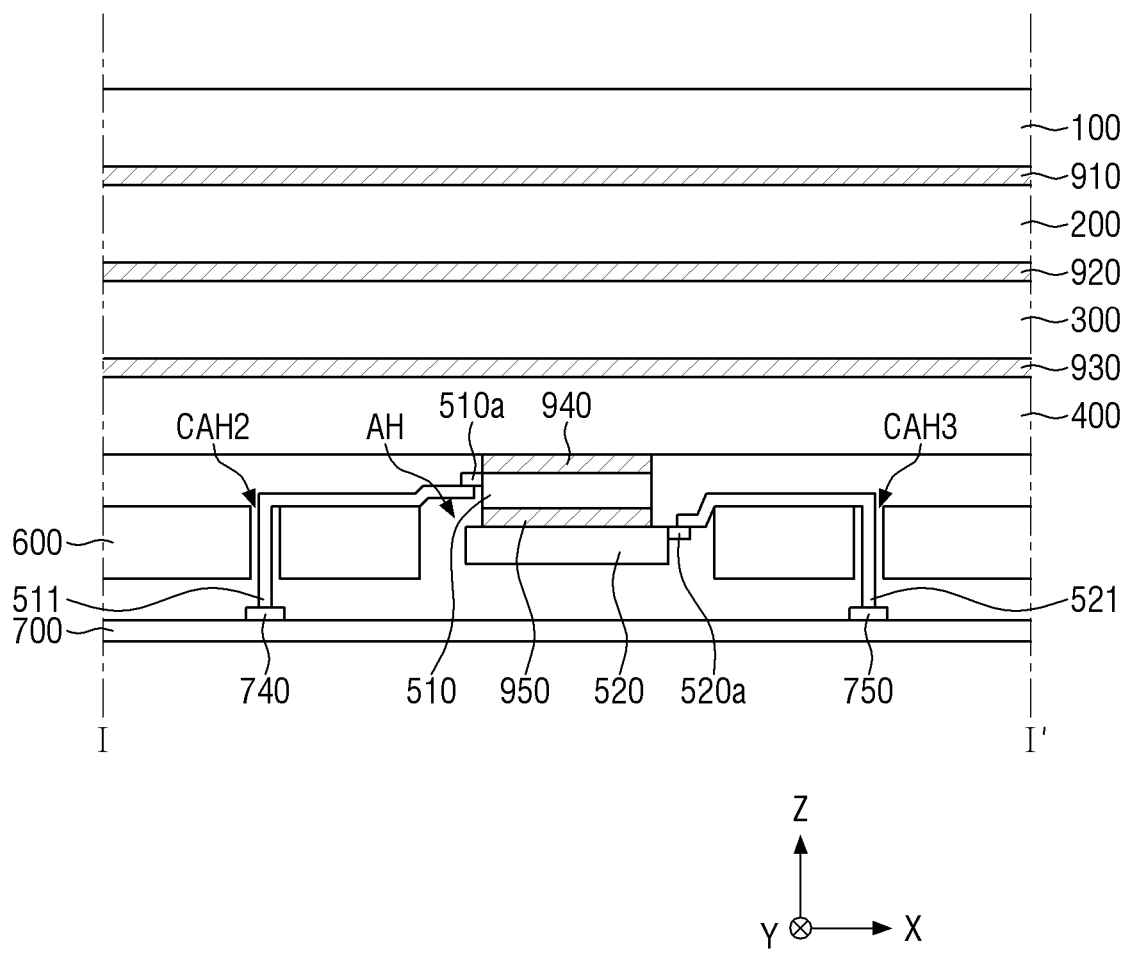
FIG. 15 is another exemplary cross-sectional view taken along the sectional line I-I' of FIGS. 3, 4, and 5.

FIG. 15 is another exemplary cross-sectional view taken along the sectional line I-I' of FIGS. 3, 4, and 5.

The exemplary embodiment of FIG. 15 differs from the exemplary embodiment of FIG. 6 in that the height of the second sound generating device 520 is smaller than the height of the first sound generating device 510, and that the width, in the first direction (or the X-axis direction), of the second sound generating device 520 is greater than the width, in the first direction (or the X-axis direction), of the first sound generating device 510. The exemplary embodiment of FIG. 15 will hereinafter be described focusing mainly on the differences with the exemplary embodiment of FIG. 6.

Referring to FIG. 15, the first sound generating device 510 may vibrate in the vertical direction (or the Z-axis direction), and the second sound generating device 520 may vibrate in the horizontal direction (or the X- or Y-axis direction). When the second sound generating device 520 vibrates in the horizontal direction (or the X- or Y-axis direction), the voice coil, the mass body, and the spring of the second sound generating device 520 may be aligned in the horizontal direction (or the X- or Y-axis direction), and as a result, the width, in the first direction (or the X-axis direction) or the second direction (or the Y-axis direction), of the second sound generating device 520 may be greater than the width, in the first direction (or the X-axis direction) or the second direction (or the Y-axis direction), of the first sound generating device 510. Also, the height of the second sound generating device 520 may be smaller than the height of the first sound generating device 510. The height of the first sound generating device 510 refers to the length, in the third direction (or the Z-axis direction), of the first sound generating device 510, and the height of the second sound generating device 520 refers to the length, in the third direction (or the Z-axis direction), of the second sound generating device 520.

Figure 16:
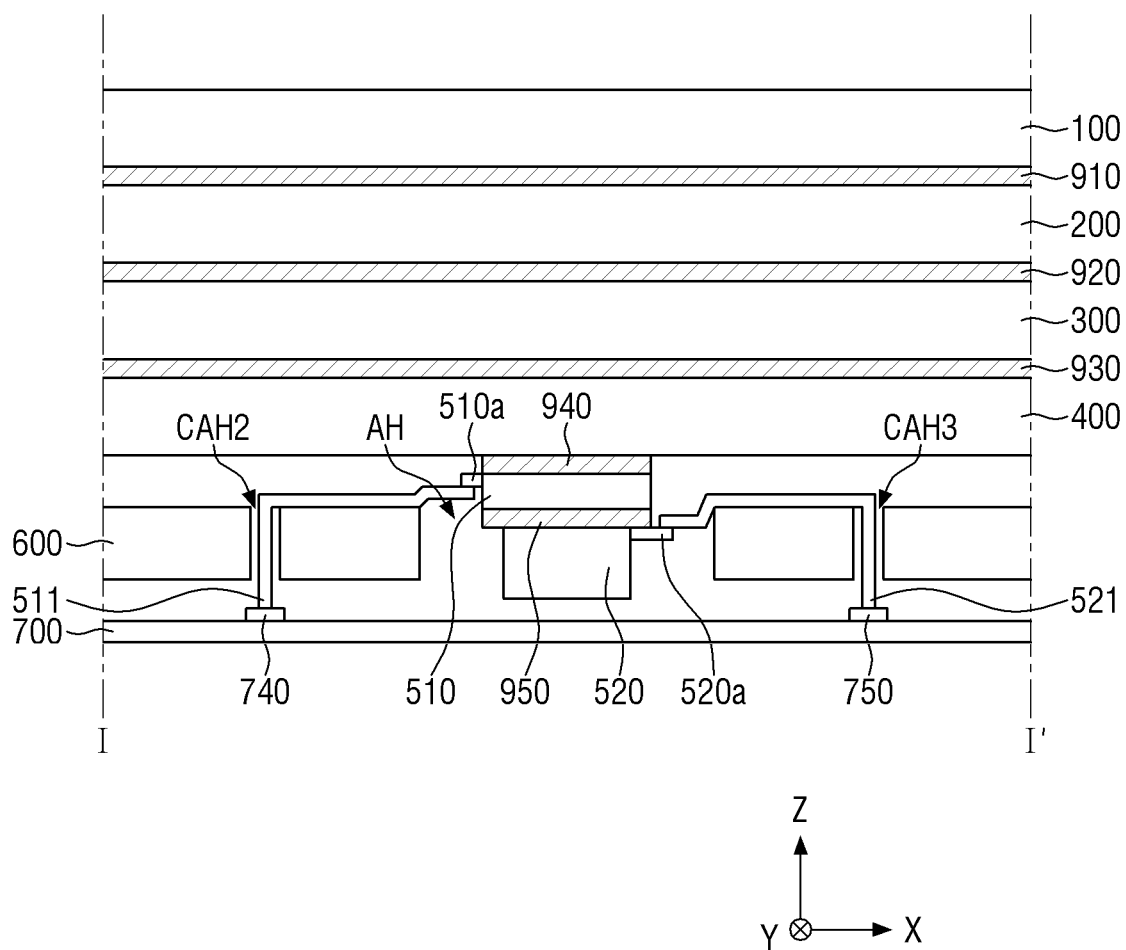
FIG. 16 is another exemplary cross-sectional view taken along the sectional line I-I' of FIGS. 3, 4, and 5.

FIG. 16 is another exemplary cross-sectional view taken along the sectional line I-I' of FIGS. 3, 4, and 5.

The exemplary embodiment of FIG. 16 differs from the exemplary embodiment of FIG. 6 in that the height of the second sound generating device 520 is greater than the height of the first sound generating device 510, and that the width, in the first direction (or the X-axis direction), of the second sound generating device 520 is smaller than the width, in the first direction (or the X-axis direction), of the first sound generating device 510. The exemplary embodiment of FIG. 16 will hereinafter be described focusing mainly on the differences with the exemplary embodiment of FIG. 6.

Referring to FIG. 16, the first and second sound generating devices 510 and 520 may both vibrate in the vertical direction (or the Z-axis direction). When the second sound generating device 520 vibrates in the vertical direction (or the Z-axis direction), the voice coil, the mass body, and the spring of the second sound generating device 520 may be aligned in the vertical direction (or the Z-axis direction), and as a result, the height of the second sound generating device 520 may be greater than the height of the first sound generating device 510. The height of the first sound generating device 510 refers to the length, in the third direction (or the Z-axis direction), of the first sound generating device 510, and the height of the second sound generating device 520 refers to the length, in the third direction (or the Z-axis direction), of the second sound generating device 520. Also, the width, in the first direction (or the X-axis direction) or the second direction (or the Y-axis direction), of the second sound generating device 520 may be smaller than the width, in the first direction (or the X-axis direction) or the second direction (or the Y-axis direction), of the first sound generating device 510.

Figure 17:
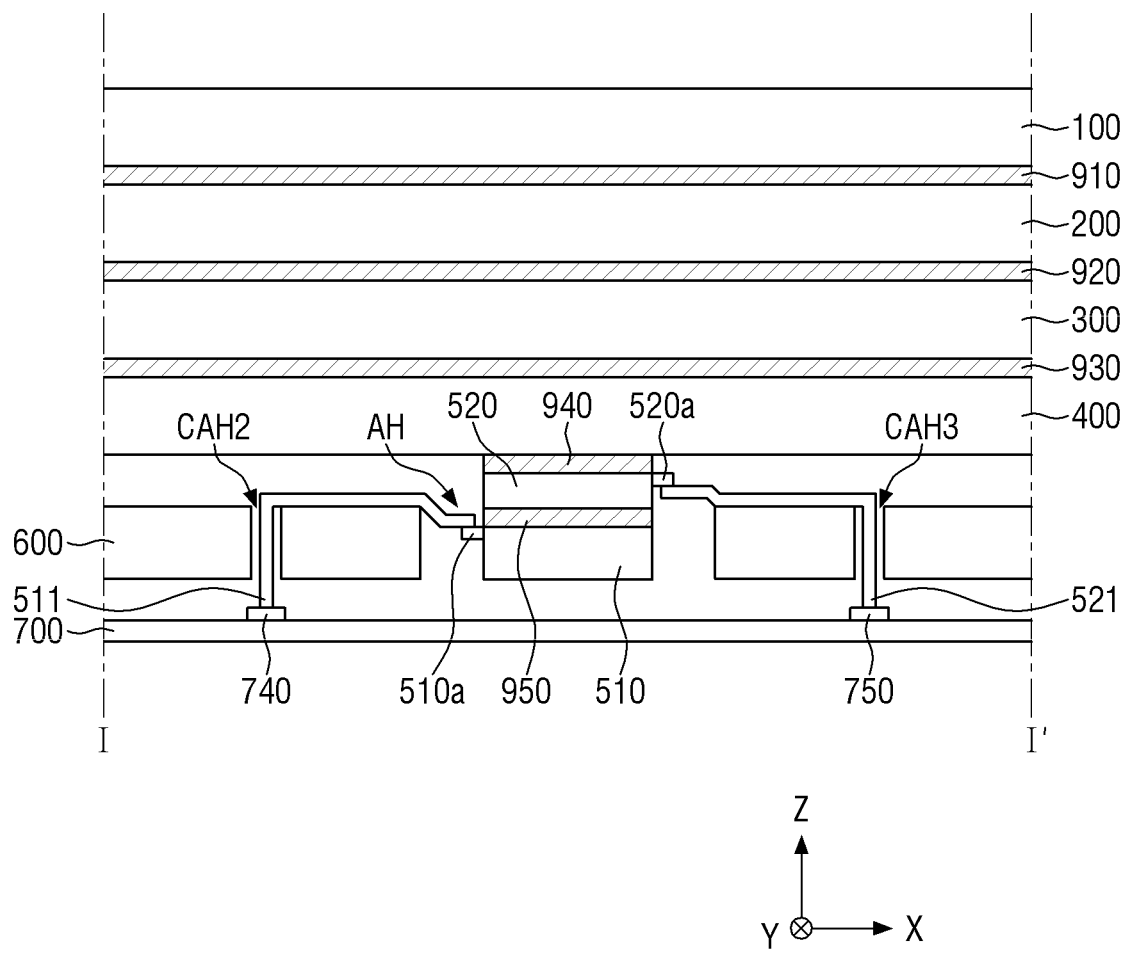
FIG. 17 is another exemplary cross-sectional view taken along the sectional line I-I' of FIGS. 3, 4, and 5.

FIG. 17 is another exemplary cross-sectional view taken along the sectional line I-I' of FIGS. 3, 4, and 5.

The exemplary embodiment of FIG. 17 differs from the exemplary embodiment of FIG. 6 in that the first sound generating device 510 is disposed below the second sound generating device 520. The exemplary embodiment of FIG. 17 will hereinafter be described focusing mainly on the difference with the exemplary embodiment of FIG. 6.

Referring to FIG. 17, the second sound generating device 520 may be disposed below the panel bottom support 400, and the first sound generating device 510 may be disposed below the second sound generating device 520. In this case, the second sound generating device 520 may be attached to the bottom surface of the panel bottom support 400 via the fourth adhesive member 940, and the first sound generating device 510 may be attached to the bottom surface of the second sound generating device 520 via the fifth adhesive member 950. The fourth and fifth adhesive members 940 and 950 may be PSAs.

FIG. 17 illustrates the first and second sound generating devices 510 and 520 as having the same width in the first direction (or the X-axis direction) and having the same height, but the exemplary embodiments are not limited thereto. That is, when the second sound generating device 520 vibrates in the horizontal direction (or the X- or Y-axis direction), as illustrated in FIG. 15, the height of the second sound generating device 520 may be smaller than the height of the first so and generating device 510, and the width, in the first direction (or the X-axis direction), of the second sound generating device 520 may be greater than the width, in the first direction (or the X-axis direction), of the first sound generating device 510. When the second sound generating device 520 vibrates in the vertical direction (or the Z-axis direction), as illustrated in FIG. 16, the height of the second sound generating device 520 may be greater than the height of the first so and generating device 510, and the width, in the first direction (or the X-axis direction), of the second sound generating device 520 may be smaller than the width, in the first direction (or the X-axis direction), of the first sound generating device 510.

According to the exemplary embodiment of FIG. 17, the display device 10 not only can provide sounds using the first and second sound generating devices 510 and 520, which are disposed below the display panel 300, but also can provide haptic feedback to the user by causing the second sound generating device 520 to vibrate. Accordingly, a front speaker can be eliminated from the front of the display device 10, and as a result, the display area at the front of the display device 10 can be increased.

In addition, according to the exemplary embodiment of FIG. 17, since the first sound generating device 510 is formed as a piezoelectric actuator having a high sound pressure level in a high frequency range and the second sound generating device 520 is formed as an LRA having a high sound pressure level in a low frequency range, the display device 10 can provide the user with sounds having a high sound pressure level in both the low frequency range and the high frequency range.

Figure 18:
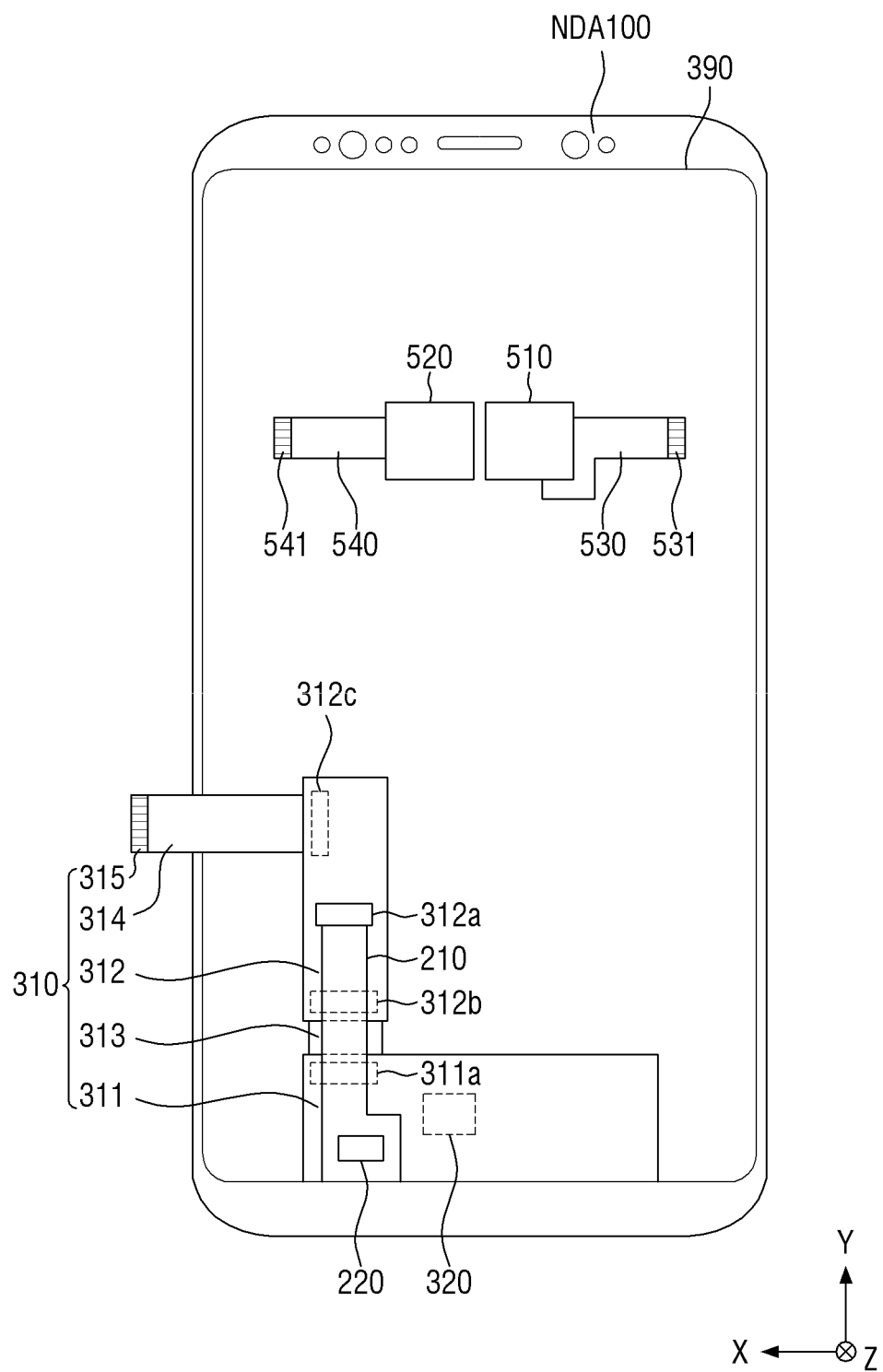
FIG. 18 is a bottom view illustrating another example of the cover window, the touch circuit board, the display panel, the display circuit board, the panel bottom member, the first sound generating device, the second sound generating device, the first sound circuit board, and the second sound circuit board of FIG. 2.
Figure 19:
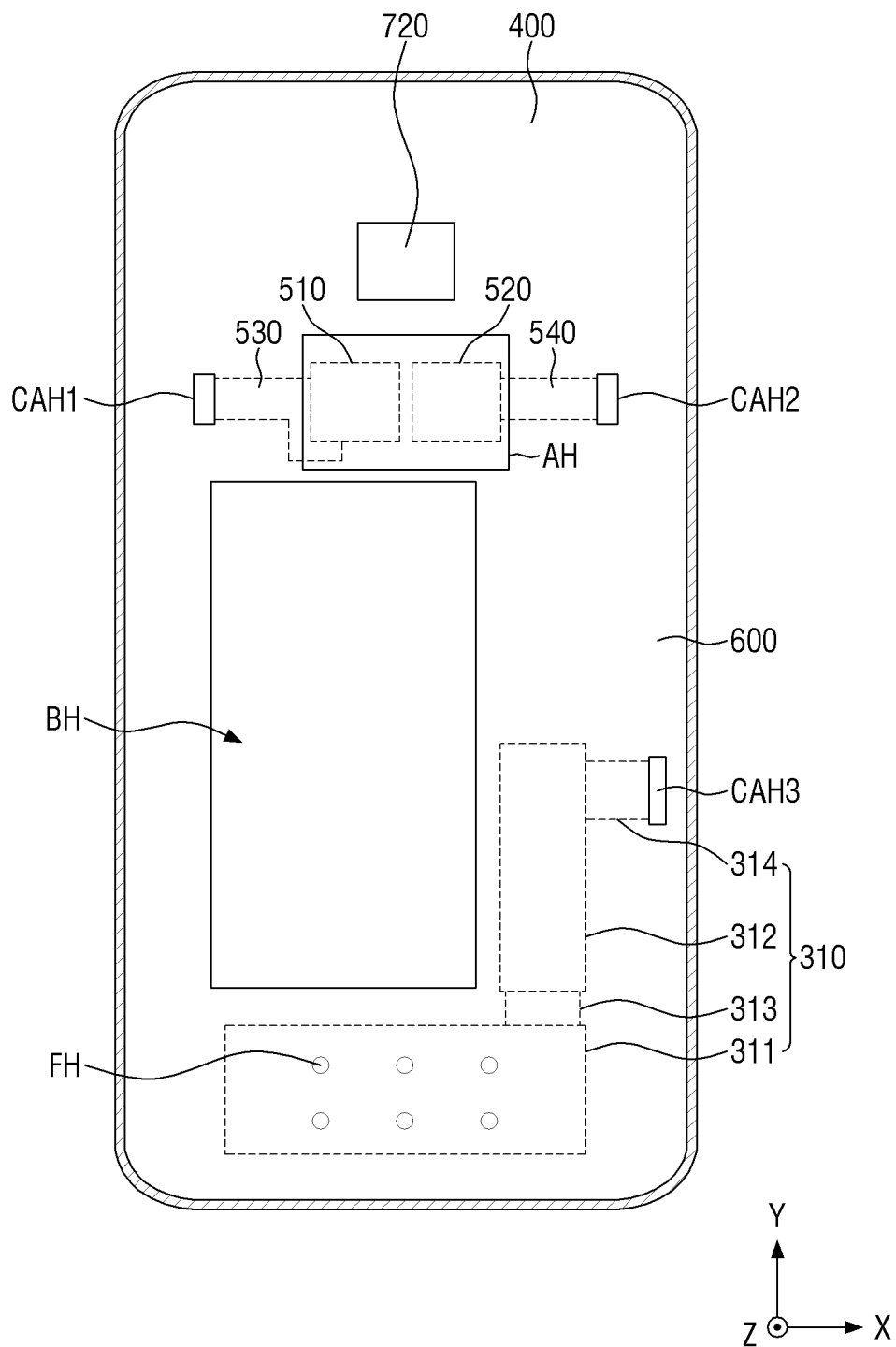
FIG. 19 is a plan view illustrating another example of the display circuit board, the second connection cable, the first sound generating device, the first sound circuit board, the second sound generating device, the second sound circuit board, and the middle frame of FIG. 2.
Figure 20:
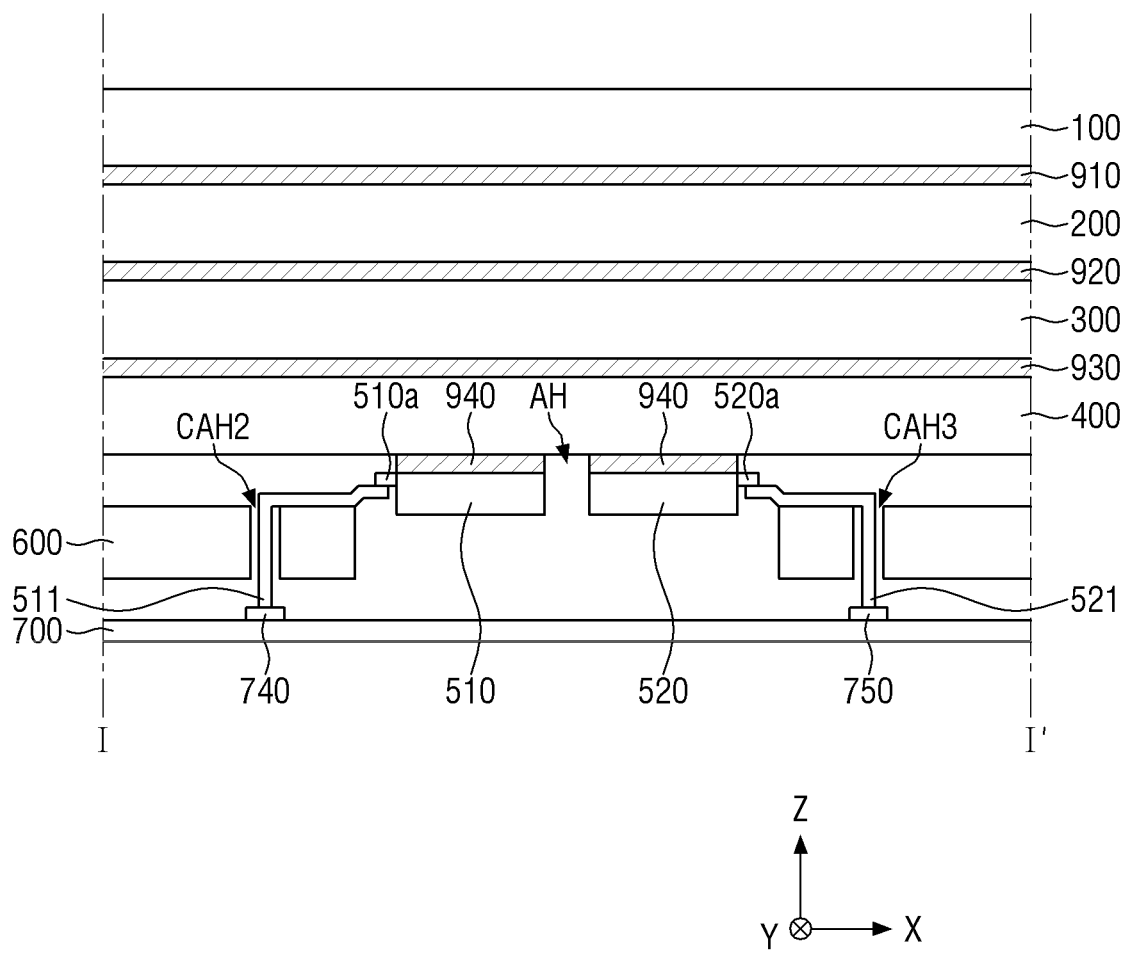
FIG. 20 is another exemplary cross-sectional view taken along the sectional line I-I' of FIGS. 5, 18, and 19.

FIG. 18 is a bottom view illustrating another example of the cover window 100, the touch circuit board 210, the display panel 300, the display circuit board 310, the panel bottom support 400, the first sound generating device 510, the second sound generating device 520, the first sound circuit board 530, and the second sound circuit board 540 of FIG. 2. FIG. 19 is a plan view illustrating other examples of the display circuit board 310, the second connection cable 314, the first sound generating device 510, the first sound circuit board 530, the second sound generating device 520, the second sound circuit board 540, and the middle frame of FIG. 2. FIG. 20 is another exemplary cross-sectional view taken along the sectional line I-I' of FIGS. 5, 18, and 19.

The exemplary embodiment of FIGS. 18, 19, and 20 differs from the exemplary embodiment of FIGS. 3, 4, and 6 in that the first and second sound generating devices 510 and 520 do not overlap with each other. Thus, the exemplary embodiment of FIGS. 18, 19, and 20 will hereinafter be described focusing mainly on the difference with the exemplary embodiment of FIGS. 3, 4, and 6.

Referring to FIGS. 18, 19, and 20, the first and second sound generating devices 510 and 520 may be disposed below the panel bottom support 400. The first and second sound generating devices 510 and 520 may not overlap with each other. The first and second sound generating devices 510 and 520 may be disposed adjacent to each other.

The first and second sound generating devices 510 and 520 may be attached to the bottom surface of the panel bottom support 400. In this case, the first and second sound generating devices 510 and 520 may be attached to the bottom surface of the panel bottom support 400 via the fourth adhesive member 940. The fourth adhesive member 940 may be a PSA.

According to the exemplary embodiment of FIGS. 18, 19, and 20, the display device 10 not only can provide sounds using the first and second sound generating devices 510 and 520, which are disposed below the display panel 300, but also can provide haptic feedback to the user by causing the second sound generating device 520 to vibrate. Accordingly, a front speaker can be eliminated from the front of the display device 10, and as a result, the display area at the front of the display device 10 can be increased.

In addition, according to the exemplary embodiment of FIGS. 18, 19, and 20, since the first sound generating device 510 is formed as a piezoelectric actuator having a high sound pressure level in a high frequency range and the second sound generating device 520 is formed as an LRA having a high sound pressure level in a low frequency range, the display device 10 can provide the user with sounds having a high sound pressure level in both the low frequency range and the high frequency range.

Figure 21:
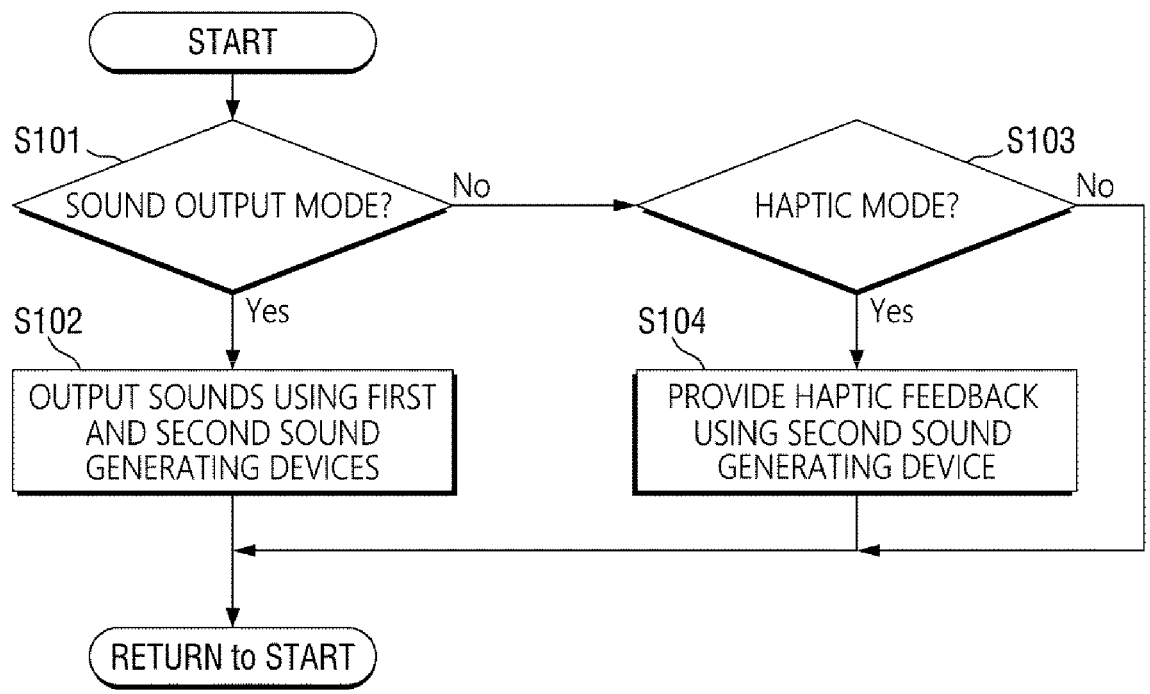
FIG. 21 is a flowchart illustrating a method of driving sound generators in a display device according to an exemplary embodiment of the invention.

FIG. 21 is a flowchart illustrating a method of driving sound generating devices in a display device according to an exemplary embodiment of the invention.

Referring to FIG. 21, the main processor 710 determines whether the display device 10 is being driven in the sound output mode (S101). The sound output mode is a mode in which the display device 10 outputs or generates sounds by executing an application such as a music or video player application. Also, the sound output mode is a mode in which the user performs a voice or video call via the display device 10 by using the mobile communication module of the main circuit board 700.

Thereafter, the main processor 710 controls the display device 10 to output sounds in the sound output mode (S102) by using both the first and second sound generating devices 510 and 520 to cause the display panel 300 to vibrate.

Specifically, in the sound output mode, the main processor 710 outputs or transmits the first sound data to the first sound driving unit 760 and the second sound data to the second sound driving unit 770. The first sound driving unit 760 generates the first and second driving voltages based on the first sound data. The first sound driving unit 760 outputs or transmits the first and second driving voltages to the first and second electrodes 512 and 513 of the first sound generating device 510 via the first sound connector 740 and the first sound circuit board 530. The second sound driving unit 770 generates an AC voltage based on the second sound data. The second sound driving unit 770 outputs or transmits the AC voltage to the second sound generating device 520 via the second sound connector 750 and the second sound circuit board 540.

The first sound generating device 510 vibrates in accordance with the first and second driving voltages, and the second sound generating device 520 vibrates in accordance with the AC voltage. The display panel 300 vibrates vertically in accordance with the vibration of the first and second sound generating devices 510 and 520, and as a result, the display device 10 can output sounds.

Figure 22A:
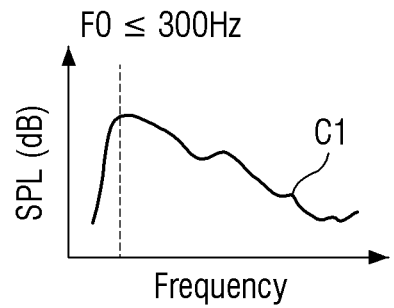
FIGS. 22A, 22B, and 22C are graphs showing the sound pressures of sounds generated by the first and second sound generating devices.
Figure 22B:
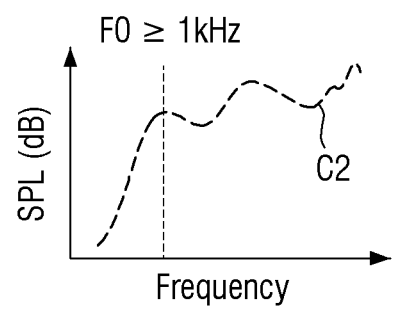

Specifically, since the first sound generating device 510 is formed as a piezoelectric actuator, sounds output by the first sound generating device 510 may have a frequency F0 of 1 kHz, as illustrated in FIG. 22B. That is, sounds output by the first sound generating device 510 may have a high sound pressure level in a high frequency range HFR.

Since the second sound generating device 520 is formed as an LRA, sounds output by the second sound generating device 520 may have a frequency F0 of 300 Hz, as illustrated in FIG. 22A. That is, sounds output by the second sound generating device 520 may have a high sound pressure level in a low frequency range LFR.

Figure 22C:
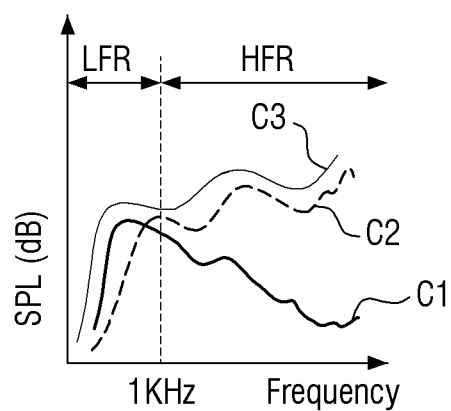

Accordingly, sounds output by the first and second sound generating devices 510 and 520 may have a high sound pressure level in both the low frequency range LFR and the high frequency range HFR, as illustrated in FIG. 22C. That is, the display device 10 can provide high-quality sounds to the user.

FIGS. 22A, 22B, and 22C are graphs showing the sound pressures of sounds generated by the first and second sound generating devices 510 and 520. Referring to FIGS. 22A, 22B, and 22C, the X axis represents the vibration frequency of the display panel 300, which is caused by the first and second sound generating devices 510 and 520 to vibrate, the Y axis represents sound pressure level (SPL), and F0 denotes the minimum frequency at which the vibration displacement of the display panel 300 exceeds a reference level. The low frequency range LFR is a range where the vibration frequency of the display panel 300 is 1 kHz or lower, and the high frequency range HFR is a range where the vibration frequency of the display panel 300 is higher than 1 kHz.

Referring again to FIG. 21, if the display device 10 is not being driven in the sound output mode, the main processor 710 determines whether the display device 10 is being driven in the haptic mode (S103). The haptic mode is a mode for providing haptic feedback to the user by causing the display device 10 to vibrate.

Thereafter, the main processor 710 causes the display panel 300 to vibrate by using the second sound generating device 520 in the haptic mode and thus controls the display device 10 to provide haptic feedback to the user (S104).

The main processor 710 outputs or transmits haptic data to the second sound driving unit 770 in the haptic mode. The second sound driving unit 770 generates an AC voltage based on the haptic data. The second sound driving unit 770 outputs or transmits the AC voltage to the second sound generating device 520 via the second sound connector 750 and the second sound circuit board 540.

The second sound generating device 520 vibrates in accordance with the AC voltage. The display panel 300 vibrates in accordance with the vibration of the second sound generating device 520, and as a result, haptic feedback can be provided to the user. The second sound generating device 520 can vibrate at a higher vibration displacement (or amplitude) in a relatively narrower frequency range in the haptic mode than in the sound output mode.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel; and
   first and second sound generating devices configured to generate sounds and vibrate the display panel,
   wherein the first sound generating device has a higher sound pressure level than the second sound generating device in a first frequency range, and the second sound generating device has a higher sound pressure level than the first sound generating device in a second frequency range lower than the first frequency range, and
   wherein the first sound generating device and the second sound generating device at least partially overlap each other in a thickness direction of the display panel.

2. The display device of claim 1, wherein at least one of the first and second sound generating devices are integrated in the display device.

3. The display device of claim 2, wherein the first and second sound generating devices are disposed below the display device.

4. A display device comprising:
   a display panel; and
   first and second sound generating devices configured to generate sounds and vibrate the display panel, wherein the first sound generating device has a higher sound pressure level than the second sound generating device in a first frequency range, and the second sound generating device has a higher sound pressure level than the first sound generating device in a second frequency range lower than the first frequency range,
wherein the first and second sound generating devices are selected from a group consisting of piezoelectric actuators and linear resonant actuators.

5. The display device of claim 3, wherein the second sound generating device is disposed below the first sound generating device.

6. A display device comprising:
a display panel; and
first and second sound generating devices configured to generate sounds and vibrate the display panel,
wherein the first sound generating device has a higher sound pressure level than the second sound generating device in a first frequency range, and the second sound generating device has a higher sound pressure level than the first sound generating device in a second frequency range lower than the first frequency range,
wherein the first sound generating device comprises:
a first electrode to which a first driving voltage is applied;
a second electrode to which a second driving voltage is applied; and
a vibration layer which is disposed between the first and second electrodes and contracts or expands in response to the first and second driving voltages applied to the first and second electrodes, respectively.

7. The display device of claim 6, wherein the first electrode comprises:
a first stem electrode; and
first branch electrodes branched off from the first stem electrode, and wherein the second electrode comprises:
a second stem electrode; and
second branch electrodes which are branched off from the second stem electrode, the second branch electrodes extending substantially parallel to the first branch electrodes.

8. The display device of claim 7, wherein the first branch electrodes and the second branch electrodes are alternately arranged along a direction substantially parallel to the first stem electrode.

9. The display device of claim 7, wherein
the first stem electrode is disposed on one side of the vibration layer, and
the second stem electrode is disposed on the other side of the vibration layer.

10. The display device of claim 7, wherein the vibration layer comprises first and second contact holes penetrating the vibration layer,
wherein the first stem electrode is disposed in the first contact hole penetrating the vibration layer, and
wherein the second stem electrode is disposed in the second contact hole penetrating the vibration layer.

11. The display device of claim 7, wherein the first sound generating device comprises:
a first pad electrode connected to the first electrode; and
a second pad electrode connected to the second electrode.

12. The display device of claim 11, further comprising:
a first sound circuit board connected to the first and second pad electrodes; and
a second sound circuit board connected to a second sound pad electrode of the second sound generating device.

13. The display device of claim 12, further comprising:

a middle frame disposed below the display panel, and having first and second through holes penetrating the middle frame.

14. The display device of claim 13, further comprising:
a main circuit board disposed below the middle frame and including first and second sound connectors.

15. The display device of claim 14, wherein
one end of the first sound circuit board is connected to the first sound connector through the first through hole of the middle frame, and
one end of the second sound circuit board is connected to the second sound connector through the second through hole of the middle frame.

16. The display device of claim 14, wherein the main circuit board comprises:
a first sound driving unit configured to transmit the first and second driving voltages to the first sound generating device;
a second sound driving unit configure to transmit an alternating current voltage to the second sound generating device; and
a main processor configured to transmit first sound data to the first sound driving unit and transmit second sound data or haptic data to the second sound generating device.

17. The display device of claim 14, further comprising:
a display circuit board attached to one side of the display panel; and
a connection cable connected to a connector of the display circuit board,
wherein the connection cable is connected to a main connector of the main circuit board through a third through hole which penetrates the middle frame.

18. The display device of claim 17, wherein the first and second sound connectors are disposed on one surface of the main circuit board, and
wherein the main circuit board is disposed on the other surface of the main circuit board.

19. The display device of claim 1, wherein
the first sound generating device is configured to vibrate in a vertical direction with respect to a surface of the display panel, and
the second sound generating device is configured to vibrate in a horizontal direction with respect to the surface of the display panel.

20. The display device of claim 1, wherein the first and second sound generating devices are configured to vibrate in a vertical direction with respect to a surface of the display panel.

21. The display device of claim 20, further comprising:
a member connecting one side of the first sound generating device and one side of the second sound generating device.

22. A method of driving first and second sound generating devices in a display device in which the first sound generating device has a higher sound pressure level than the second sound generating device in a first frequency range, and the second sound generating device has a higher sound pressure level than the first sound generating device in a second frequency range lower than the first frequency range, the first sound generating device and the second sound generating device at least partially overlapping each other in a thickness direction of the display device, the method comprising:
generating sounds in a sound output mode by driving the first and second sound generating devices; and generating haptic feedback in a haptic mode by driving the second sound generating device to cause the display device to vibrate.

23. The method of claim 22, wherein:

the display device comprises a display panel, and generating the sounds in the sound output mode comprises vibrating the display panel.

24. The method of claim 22, wherein:

the display device comprises a display panel, and generating the haptic feedback in the haptic mode comprises vibrating the display panel.

25. The method of claim 22, wherein the display device further comprising a processor generating output signals driving the first and second sound generating devices in either the sound output mode or the haptic mode.

* * * * *